United States Patent [19]
DeHon et al.

[11] Patent Number: 6,052,773
[45] Date of Patent: Apr. 18, 2000

[54] DPGA-COUPLED MICROPROCESSORS

[75] Inventors: André DeHon, Cambridge; Michael Bolotski, Somerville; Thomas F. Knight, Jr., Belmont, all of Mass.

[73] Assignee: Massachusetts Institute of Technology, Cambridge, Mass.

[21] Appl. No.: 08/471,836

[22] Filed: Jun. 6, 1995

Related U.S. Application Data

[63] Continuation-in-part of application No. 08/426,524, Apr. 10, 1995, abandoned, which is a continuation-in-part of application No. 08/388,230, Feb. 10, 1995, abandoned.

[51] Int. Cl.$^7$ ..................................................... G06F 15/00
[52] U.S. Cl. .............................. 712/43; 712/43; 712/229
[58] Field of Search ........................ 395/800.37, 800.36, 395/800.41, 800.42, 800.43, 384; 712/32, 36, 41, 42, 43, 208, 729

[56] References Cited

U.S. PATENT DOCUMENTS

| | | | |
|---|---|---|---|
| 4,336,601 | 6/1982 | Tanaka ..................................... | 364/900 |
| 4,354,228 | 10/1982 | Moore et al. ............................ | 364/200 |
| 4,493,029 | 1/1985 | Thierbach ............................... | 364/200 |

(List continued on next page.)

OTHER PUBLICATIONS

DeHon, Notes on Coupling Processors with Reconfigurable Logic, Mar. 1995.
Estrin et al. "Parallel Processing in a Restructurable Computer", 1963.
Estrin et al. "Automatic Assignment of Computations in a Variable Structure Computer", 1963.
Wittis "One Chip: An FPGA Processor With Reconfigurable Logic", 1995.
G. Estrin, et al., "Automatic Assignment of Computations in a Variable Structure Computer System," IEEE Transactions on Electronic Computers, pp. 755–773 (1963).
G. Estrin, et al., "Parallel Processing in a Restructurable Computer System," IEEE Transactions on Electronic Computers, pp. 747–755.
Hadley, J.D., et al., "Design Methodologies for Partially Reconfigured Systems," *IEEE Symposium on FPGAs for Custom Computing Machines, FCCM '95*, Napa, CA, (Apr. 19–Apr. 21, 1995).
Razdan, R., "PRISC: Programmable Reduced Instruction Set Computers", doctoral thesis, Harvard University, Cambridge, Massachusetts (May 1994).

(List continued on next page.)

*Primary Examiner*—Larry D. Donaghue
*Attorney, Agent, or Firm*—Hamilton, Brook, Smith & Reynolds, P.C.

[57] ABSTRACT

A single chip microprocessor or memory device has reprogrammable characteristics according to the invention. In the case of the microprocessor, a fixed processing cell is provided as is common to perform logic calculations. A portion of the chip silicon real-estate, however, is dedicated a programmable gate array. This feature enables application-specific configurations to allow adaptation to the particular time-changing demands of the microprocessor and provide the functionality required to best serve those demands. This yields application acceleration and in system-specific functions. In other cases the configurable logic acts as network interface, which allows the same basic processor design to function in any environment to which the interface can adapt.

The invention also concerns a memory device having a plurality of memory banks and configurable logic units associated with the memory banks. An interconnect is provided to enable communication between the configurable logic units. These features lessen the impact of the data bottle-neck associated with bus communications, since the processing capability is moved to the memory in the form programmable logic, which can be configured to the needs of the specific application. The inherently large on-chip bandwidth can then be utilized to increase the speed at which bulk data is processed.

22 Claims, 30 Drawing Sheets

U.S. PATENT DOCUMENTS

| | | | |
|---|---|---|---|
| 4,594,661 | 6/1986 | Moore et al. | 364/200 |
| 4,700,187 | 10/1987 | Furtek | 340/825.83 |
| 4,748,585 | 5/1988 | Chiarulli et al. | 364/900 |
| 4,771,285 | 9/1988 | Agrawal et al. | 340/825.83 |
| 4,791,602 | 12/1988 | Resnick | 364/900 |
| 4,870,302 | 9/1989 | Freeman | 307/465 |
| 4,879,688 | 11/1989 | Turner et al. | 365/201 |
| 4,918,440 | 4/1990 | Furtek | 340/825.83 |
| 4,969,121 | 11/1990 | Chan et al. | 364/900 |
| 4,992,933 | 2/1991 | Taylor | 364/200 |
| 5,019,736 | 5/1991 | Furtek | 307/465 |
| 5,027,315 | 6/1991 | Agrawal et al. | 364/900 |
| 5,038,386 | 8/1991 | Li | 382/49 |
| 5,081,375 | 1/1992 | Pickett et al. | 307/465 |
| 5,301,344 | 4/1994 | Kolchinsky | 395/800 |
| 5,315,178 | 5/1994 | Snider | 307/465 |
| 5,336,950 | 8/1994 | Popli et al. | 307/465 |
| 5,352,940 | 10/1994 | Watson | 307/465 |
| 5,361,373 | 11/1994 | Gilson | 395/800 |
| 5,379,382 | 1/1995 | Work et al. | 395/275 |
| 5,426,378 | 6/1995 | Ong | 326/39 |
| 5,737,631 | 4/1998 | Trimberger | 395/800.37 |
| 5,742,180 | 4/1998 | DeHon et al. | 326/40 |
| 5,748,979 | 5/1998 | Trimberger | 395/800.37 |
| 5,752,035 | 5/1998 | Trimberger | 395/705 |

OTHER PUBLICATIONS

Wirthlin, M.J., et al., "A Dynamic Instruction Set Computer," *IEEE Symposium on FPGAs for Custom Computing Machines, FCCM '95*, Napa, CA, (Apr. 19–Apr. 21, 1995).

Bolotski, M., et al., "Unifying FPGAs and SIMD Arrays," 2nd International ACM/SIGDA Workshop on FPGAs, Berkeley, CA (Feb. 13–15, 1994). *For information regarding reference, see Information Disclosure Statement.

Elliott, D.G., "Computational Ram: A Memory–SIMD Hybrid and its Application to DSP," *The Proceedings of the Custom Integrated Circuits Conference*, pp. 30.6 1–4 (May 3–6, 1992).

Jones, D, et al., "A Time–Multiplexed FPGA for Logic Emulation," University of Toronto, to appear in CICC, pp. 1–20 (May, 1995).

Wang, Q, et al., "An Array Architecture for Reconfigurable Datapaths," More FPGAs, W R Moore & W Luk (eds.), Abingdon EE&CS Books (Oxford OX2 8HR, UK), pp. 35–46 (1994).

Athanas, P.M., "An Adaptive Machine Architecture and Compiler for Dynamic Processor Reconfiguration," *Doctor's Thesis*, Division of Engineering at Brown University, (1992).

Lemoine, E., et al., "Run Time Reconfiguration of FPGA for Scanning Genomic DataBases," *IEEE Symposium on FPGAs for Custom Computing Machines, FCCM '95*, Napa, CA, (Apr. 19–Apr. 21, 1995).

Jones, C., et al., "Issues in Wireless Video Coding Using Run–Time–Reconfigurable FPGAs," *IEEE Symposium on FPGAs for Custom Computing Machines, FCCM '95*, Napa, CA, (Apr. 19–Apr. 21, 1995).

Li, J., et al., "Routability Improvement Using Dynamic Interconnect Architecture," *IEEE Symposium on FPGAs for Custom Computing Machines, FCCM '95*, Napa, CA, (Apr. 19–Apr. 21, 1995).

Chen, D.C., et al., "A Reconfigurable Multiprocessor IC for Rapid Prototyping of Algorithmic–Specific High–Speed DSP Data Paths," *IEEE Journal of Solid–State Circuits*, 27(12):1895–1904 (Dec., 1992).

Denneau, M.M., "The Yorktown Simulation Engine," *IEEE 19th Design Automation Conference*, pp. 55–59 (1982).

Razdan, R., et al., "A High Performance Microarchitecture with Hardware–Programmable Functional Units," Micro–27 Proceedings of the 27th Annual International Symposium on Microarchitecture, San Jose, California, pp. 172–180 (Nov. 30–Dec. 2, 1994).

Ling, X.P., "WASMII: A Data Driven Computer on a Virtual Hardware," Keio University, Yokohama, Japan, pp. 1–10. (Apr. 5–7, 1993), FCCM '93, Napa, CA.

Bhat, N.B., "Performance–Oriented Fully Routable Dynamic Architecture for a Field Programmable Logic Device," Memorandum No. UCB/ERL M93/42, University of California, Berkeley (Jun. 1, 1993).

DeHon, A., et al., "DPGA–Coupled Microprocessors: Commodity ICs for the Early 21st Century," *IEEE Workshop on FPGAs for Custom Computing Machines*, Napa, CA (Apr. 10–13, 1994). *For additional information regarding reference, see information Disclosure Statement.

Fried, J., et al., "NAP (No ALU Processor) The Great Communicator," *IEEE*, 2649(2):383–389 (1988).

Yeung, A.K., "A 2.4 GOPS Reconfigurable Data–Driven Multiprocessor IC for DSP," Dept. of EECS, University of California, Berkeley, pp. 1–14, (Feb. 14, 1995) ISSCC '95, pp. 108–109.

Hawley, D., "Advanced PLD Architectures," In FPGAs, W R Moore & W Luk (eds.) (UK: Abingdon EE&CS Books), pp. 11–23 (1991).

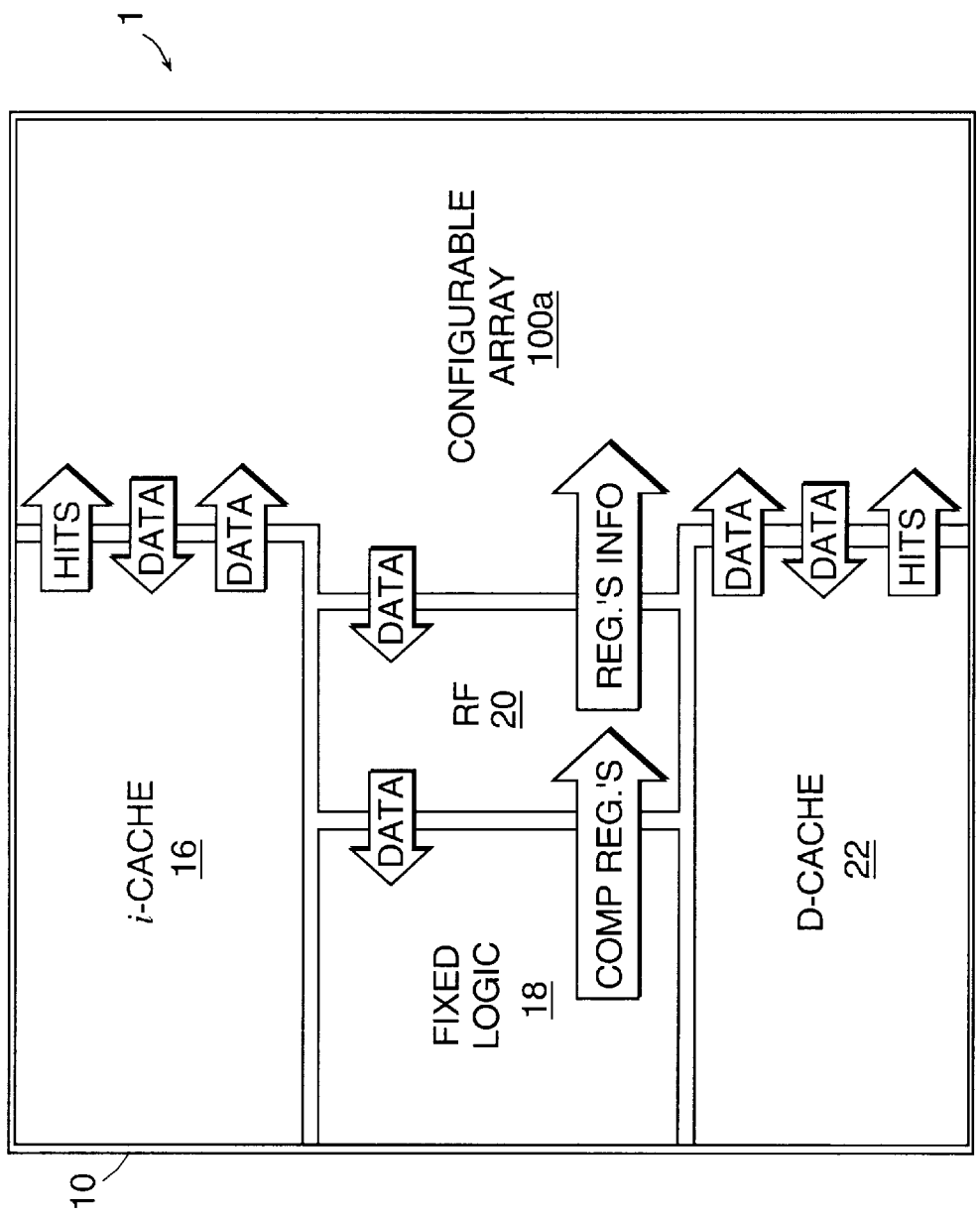

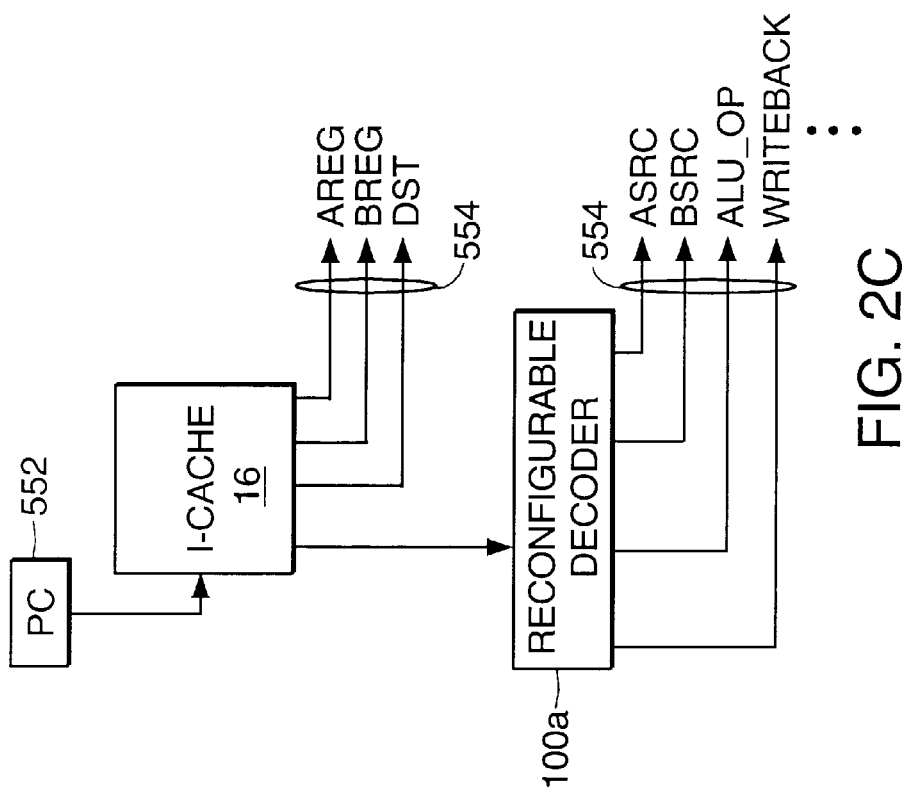

DPGA-COUPLED MICROPROCESSORS

RELATED APPLICATIONS

This is a Continuation-in-Part of application of U.S. patent application Ser. No. 08/426,524, filed Apr. 10, 1995, abandoned which is a Continuation-in-Part application of U.S. patent application Ser. No. 08/388,230, filed Feb. 10, 1995 abandoned and is related to U.S. Ser. No. 08/386,851, filed on Feb. 10, 1995, all of which are incorporated herein by this reference.

GOVERNMENT SUPPORT

The invention described herein was supported in whole or in part by Grant Nos. N00014-91-5-1698 and DABT63-92-C-0093 from the Advanced Research and Programs Administration (ARPA).

BACKGROUND OF THE INVENTION

Semiconductor processing has continued to improve steadily, allowing the fabrication of smaller and smaller devices. This trend shows little signs of abating.

Effective device densities and integrated circuit (IC) capacity improve at an exponential rate. Presently, microprocessor operational performance increases by roughly 60% per year while the number of gates increases by 25% per year. Three million gates are available for current microprocessors and over 12 million gates is expected by the end of the century.

As gate densities have improved, more of the computing system has been integrated onto the microprocessor die and larger processors have been implemented. What started as minimal instruction stream control and a simple, 4-bit, ALU has grown with the available area to include multiple 64-bit functional units including hardwired floating-point support. The basic microprocessor design has expanded to include large, on-chip memories to prevent off-chip input and output (i/o) latency from significantly degrading performance, thereby increasing instruction throughput. Today's high-performance microprocessors move towards higher execution rates using aggressive pipelining and superscalar execution utilizing multiple functional units. Cost consciousness motivates the integration of the common system and peripheral functions onto the IC die to reduce system cost and power consumption.

On a different front, reconfigurable logic has emerged as a commodity technology comparable to memories and microprocessors. Like memories, reconfigurable logic arrays rapidly adapt to new technology since the design consists of an array of simple structures. Also like memory, the regularity allows designers to focus on adapting the key logic structures to extract the highest performance from the available technology. Each reconfigurable array can be designed and tested in a single IC design yet gains volume from the myriad of diverse applications to which the general-purpose array is applied.

SUMMARY OF THE INVENTION

As trends continue, microprocessors will include more memory, more floating point units (FPUs), more arithmetic logic units (ALUs), and more system functionality, but it is not clear this will be the most judicious use of the silicon real-estate becoming available in the near future. Addition of fixed functional units will not bring about broad-based acceleration of applications in proportion to the area these fixed units consume. For a given application, the fixed functional units can be arranged to provide almost proportional improvements. Each application class, however, requires a different selection and arrangement of units to achieve such improvements. Any fixed collection of functional units control, and data paths will necessarily be sub-optimal for most applications. Moreover, any specialization must be balanced against market size to maintain commodity economics. The danger is that over-specialization will reduce the market base.

In the present invention, a microprocessor includes a fixed logic processor as is common to perform logic calculations. A portion of the chip silicon real-estate, however, is dedicated to a programmable gate array. This feature enables application-specific configurations. The gate array is configurable to adapt to the particular time-changing demands of the microprocessor to provide the functionality required to best serve those demands. This yields application acceleration and in-system-specific functions. As a result, the inventive microprocessor can serve as the principle building block for a wide range of applications including personal computers, embedded systems, application-specific computers, and general and special-purpose multiprocessors, but operate at speeds only achievable if the device were specifically designed for the applications.

In specific implementations, the programmable gate array is configurable by the processor rather than some off-chip configurer. This capitalizes on the inherently high bandwidth that is available on-chip, allowing fast configurations and thus increasing the relevance of the invention to a broad spectrum of uses. In some possibly different cases, the programmable gate array is configurable to operate as a function unit of the microprocessor. For example, it could operate as a multi-precision ALU, modulo ALU or special purpose Huffman encoder depending upon demand.

In other implementations, latency may be an issue. Since the configuration programmed into the programmable gate array will determine the speed of its operation, control signals may be necessary to coordinate on-chip communication between the gate array and the processor. Specifically, a ready-result signal is used to indicate that the programmable gate array has concluded calculations on data received from the processor. In addition, a ready-input signal is sometimes helpful to indicate that the programmable gate array is ready to receive new data from the processor.

In still other implementations, the programmable gate array is deployed to operate in close cooperation with a cache of the microprocessor to transform logic signals either being read from or written to the cache. Specifically, in the case of an instruction-cache, the programmable gate array cooperates with this cache to convert instructions to a new format that is compatible with the processor.

In further implementations, the microprocessor has an expander, a concentrator, and at least one memory unit receiving addresses and data from the expander and providing data to the concentrator. The memory is deployable as instruction and data caches or an explicit scratch pad memory, for example.

According to another aspect, the invention concerns a microprocessor having a configurable network interface. Such a device includes a processor for performing logic calculations in response to input data and instructions and a configurable input/output interface for the processor. This allows the same basic processor design to function in any environment to which the interface can adapt. As a result, during design and development, the microprocessor can be completed when incomplete information is available about the bus to which it will connect, for example. Alternatively, the same microprocessor can be deployed in a range of products with different bus and peripheral features to extend its product life time.

In specific implementations, the configurable interface is connected to address and data lines of on-chip buses of the processor and input/output pads for off-chip communications. If a hardwired load and store unit is also used, a multiplexor can selectively connect address and data lines of on-chip buses either to the load and store unit directly or the reconfigurable input/output interface.

According to still another aspect, the invention also concerns a memory device. As with most such devices, a plurality of memory banks are provided each comprising an array of memory cells. In the present invention, however, configurable logic units are associated with the memory banks and an interconnect is provided to enable communication between the configurable logic units. These features increase the speed at which data processing can take place. Typically, the processing is performed by the microprocessor and data storage is performed at the memory with a bus interconnecting the two devices. This bus, however, represents a data bottle-neck in which communications must be serialized and slowed to accommodate the physical extent of the bus. In the present invention processing capability is moved to the memory in the form of programmable logic which can be configured to the needs of the specific application. With the processing power on the memory device, the inherently large on-chip bandwidth can be used to increase the speed at which bulk data is processed as required, for example, in video image processing.

In specific implementations, bank output multiplexors are provided to select between the bank words read from the memory banks and the data words generated by the configurable logic unit. Bank input multiplexors are helpful for writing a word to the memory banks from an input to the memory device, the bank words from the memory banks or the data word generated by the configurable logic unit.

The above and other features of the invention including various novel details of construction and combinations of parts, and other advantages, will now be more particularly described with reference to the accompanying drawings and pointed out in the claims. It will be understood that the particular method and device embodying the invention is shown by way of illustration and not as a limitation of the invention. The principles and features of this invention may be employed in various and numerous embodiments without the departing from the scope of the invention.

BRIEF DESCRIPTION OF THE DRAWINGS

In the accompanying drawings, reference characters refer to the same parts throughout the different views. The drawings are not necessarily to scale; emphasis has instead been placed upon illustrating the principles of the invention. Of the drawings:

FIG. 2 is a block diagram of a microprocessor with reconfigurable array to directly access data in functional units such as registers, caches, and ALU's of the core processor;

FIG. 2B is a more detailed block diagram showing the reconfigurable array 100a serving as a reconfigurable decoder for the instruction cache 16;

FIG. 2C shows a hybrid scheme in which the reconfigurable decoder 100a generates only a portion of the instructions 554;

DETAILED DESCRIPTION OF THE PREFERRED EMBODIMENTS

1. Configurable Logic as attached logic or function unit

Figure 1:
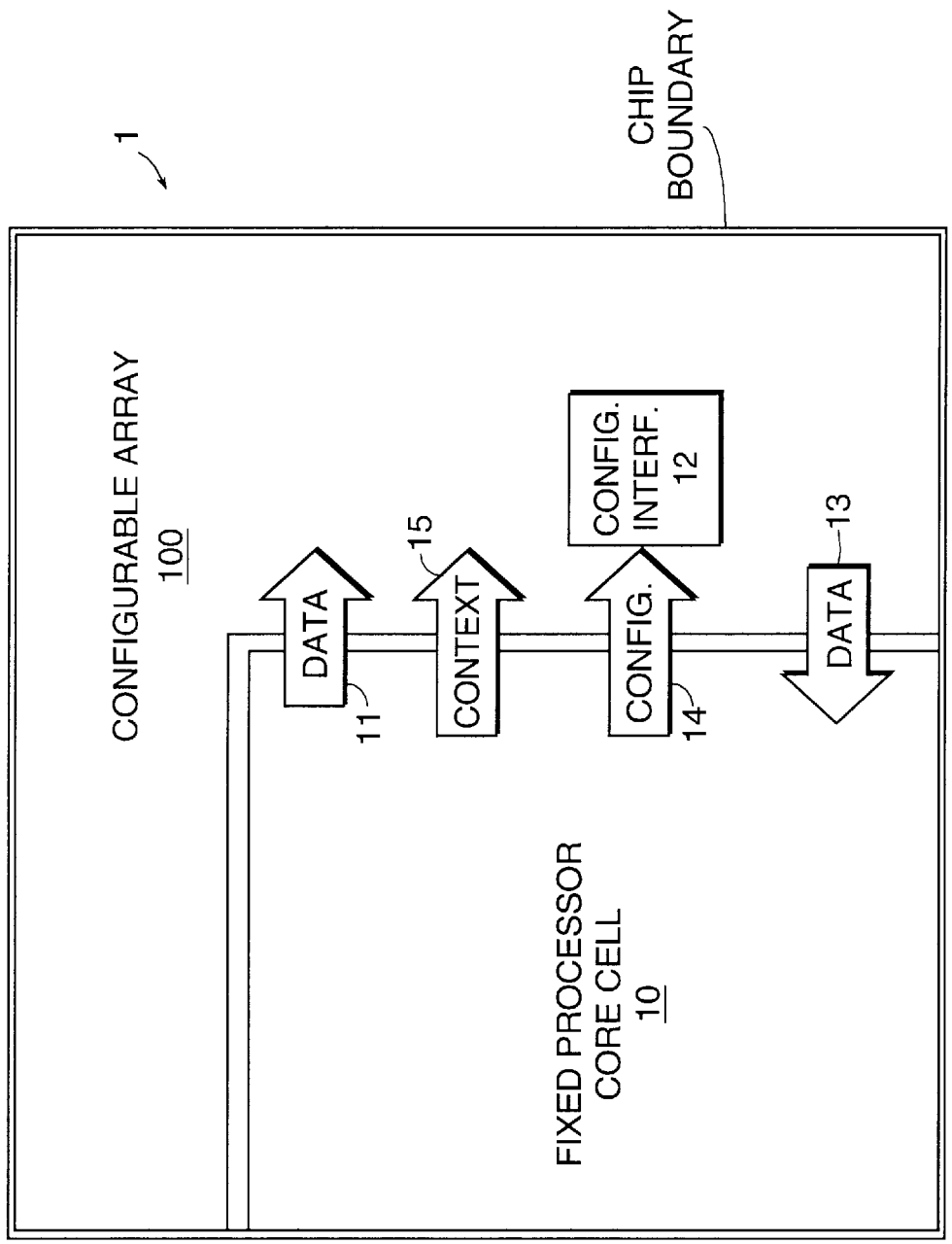
FIG. 1 is a block diagram showing the co-location of a configurable array 100 with a fixed logic processor core cell 10 on a single semiconductor chip according to the present invention.

A configurable logic-coupled processor 1 constructed according to the principles of the present invention is illustrated in FIG. 1. Generally, a fixed processor core cell 10 is located with a configurable array 100 on the same silicon die or chip. The processor core cell 10 is preferably constructed as most commonly available complex instruction set (CISC) or reduced instruction set (RISC) architectures. Minimally, the processor cell 10 includes an arithmetic logic unit (ALU), possibly a fixed processing unit (FPU), register files (RF), instruction caches, and data caches.

In operation, the configurable array 100 initially receives configuration programming 14 at power-up or under application program control from the processor cell 10. These instructions are presented through a configuring interface unit 12 that handles buffering, handshaking, and other programming protocols. Once the proper configuration has been programmed into the array 100, the processor cell 10 feeds input data 11 to and receives the data output 13 from the configurable array 100. Control instructions 15, context identifiers, are also transmitted from the processor cell 10 to the configurable array 100 during the combinational logic functions. These instruction signals initiate array reconfigurations to finish the computations or switch between multitasking or multi-threading functions, for example.

The configurable array 100 is employed by the processor core cell 10 as a programmable function unit (PFU) for application-specific acceleration. Each application program configures the reconfigurable array in a manner most beneficial to that application. For example, the operating system and applications specialize the configurable array to serve as a co-processor for compute-intensive functions such as compression, encryption, signal processing, or protocol processing. Since generally these compute-intensive tasks require the higher performance in bursts, but not continually, the configurable array 100 can be reconfigured in between tasks dynamically during the application execution.

Alternatively, a separate configurer can be implemented either on or off-chip to provide the configuration programming to the array 100. This will allow fast reconfiguration in between the bursty usage of the array to enable dynamic reconfiguration between different co-processing roles. For example, during the initial execution of an application program, when incoming data is being de-encrypted or decompressed, the configurable array can dynamically manipulate the incoming data to the processor cell 10. Later, when the number-crunching features of the application program are executing, the configurable array can be configured as a math co-processor, for example, to perform modulo-multiprecision ALU operations or Fast-Fourier transform (FFT) or Finite impulse response (FIR) operations to list a few examples.

The combination of the processor cell 10 and the configurable array 100 on the same silicon die is a key feature of the invention enabling high bandwidth communications with a low latency interface. When the configurable array is merely attached to a host processor as an external peripheral, the high overhead implicit in communication with the configurable engine located on a different chip limits the avenues for acceleration and prevents close cooperation. The low bandwidth similarly makes communication expensive and limits the throughput achievable with the reconfigurable array.

The integration of the processor core cell 10 and the reconfigurable array 100 also decreases reconfiguration overhead. As a mere peripheral, the reconfiguration time for the array must be amortized over a large amount of processing to justify the array's reconfiguration. Further, a single configuration must be generally kept throughout the application even if different portions of the application might be accelerated with different kinds of specialized logic. In contrast, the present invention can be used productively in multi-tasking or time-shared systems. The reduced communication overhead enables greater increases in the kinds of application-specific specialization, providing significant acceleration. Still further, the implementation of a dynamically programmable gate array (DPGA) architecture facilitates multi-tasking by assigning each task to a different context of the array 100.

On the programming side, efficient deployment of the configurable logic as useful PFU's involves native integration with conventional compiler technology. Generally, subroutines should be provided for the configurable array as library routines. These routines can then be accessed from high-level programming languages. The compiler profiles the application and selects the hardware configurations and library routines that best accelerate each application. The compiler replaces sequences of the instructions on the processor's fixed logic with known hardware subroutines as potential optimization transforms and evaluates the relative merits in a matter similar to conventional compiler transforms. The close integration of the reconfigurable array with the processor in some ways supplants the usefulness of special purpose architectures as application specific integrated circuits. By including reconfigurable logic in the microprocessor, application oriented benefits of architecture specialization are combined with the economic benefits of commoditization.

Figure 1B:
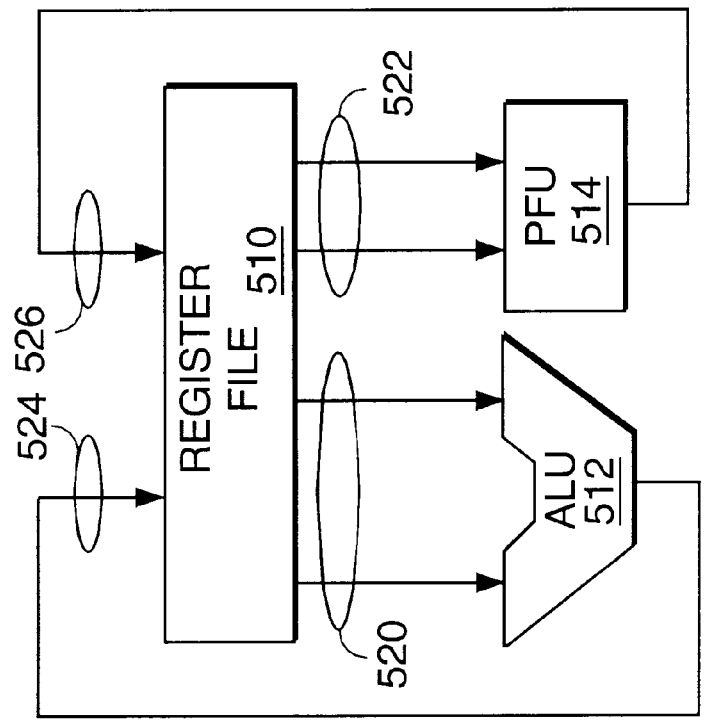
FIG. 1B shows an alternative implementation in which the ALU 512 and the PFU 514 are located in parallel.
Figure 1A:
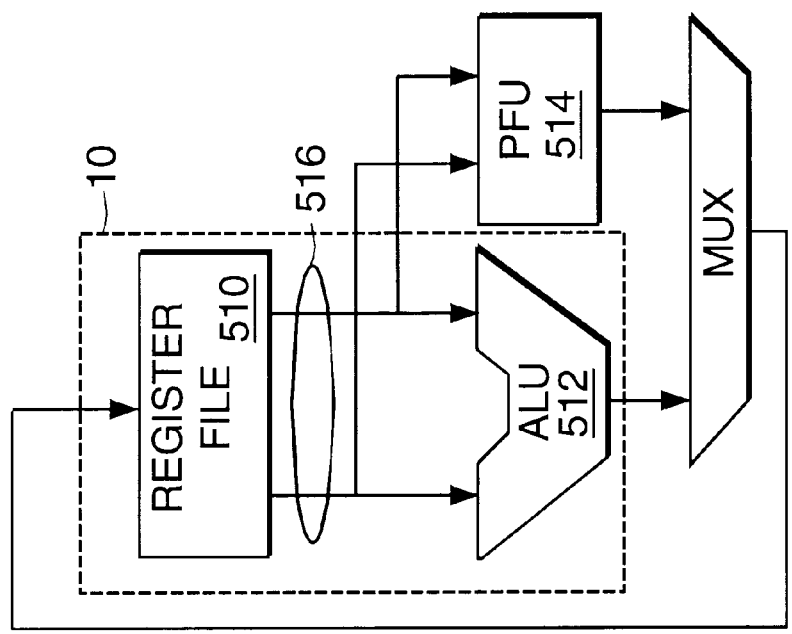
FIG. 1A shows a specific implementation of the present invention in which a programmable function unit (PFU) 514 is located with an arithmetic logic unit (ALU) 512 to operate on logic values stored in the register file 510.

FIG. 1A shows one option for integrating the configurable logic shown here as a single programmable function unit (PFU) 514 with the traditional RF/ALU 510,512 organization of the processor cell 10. The RF ports 516 are shared between the ALU 512 and PFU 514 allowing at most one result from each functional unit on each cycle and allowing at most two operands to be sent to the ALU/PFU 512,514 combination each cycle.

FIG. 1B is an alternative configuration which has independent read ports 520,522 and write ports 524,526 from the register file 510 allowing the ALU 512 and the PFU 514 to operate independently and fully in parallel.

Figure 1C:
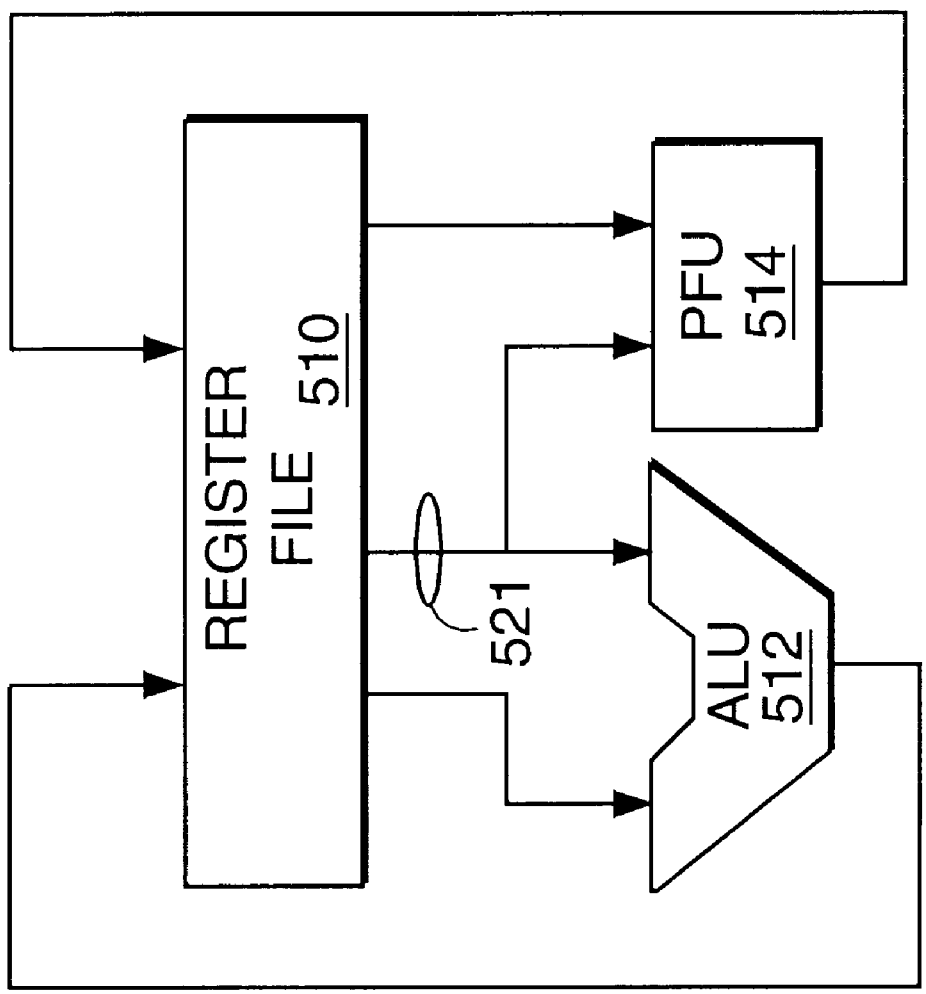
FIG. 1C shows another implementation in which the ALU 512 and PFU 514 share some lines from the register file.

Hybrids between the two extremes shown in FIGS. 1A and 1B are also possible. In FIG. 1C, one of three read ports 521 from register file 510 is shared between the ALU 512 and PFU 514. This reduces the number of read/write ports from the register file 510, relative to the FIG. 1B implementation, and allows the register file 510 to be simpler and faster. The number of ports is increased over the FIG. 1A implementation allowing a larger range of operations to occur in parallel.

Figure 1D:
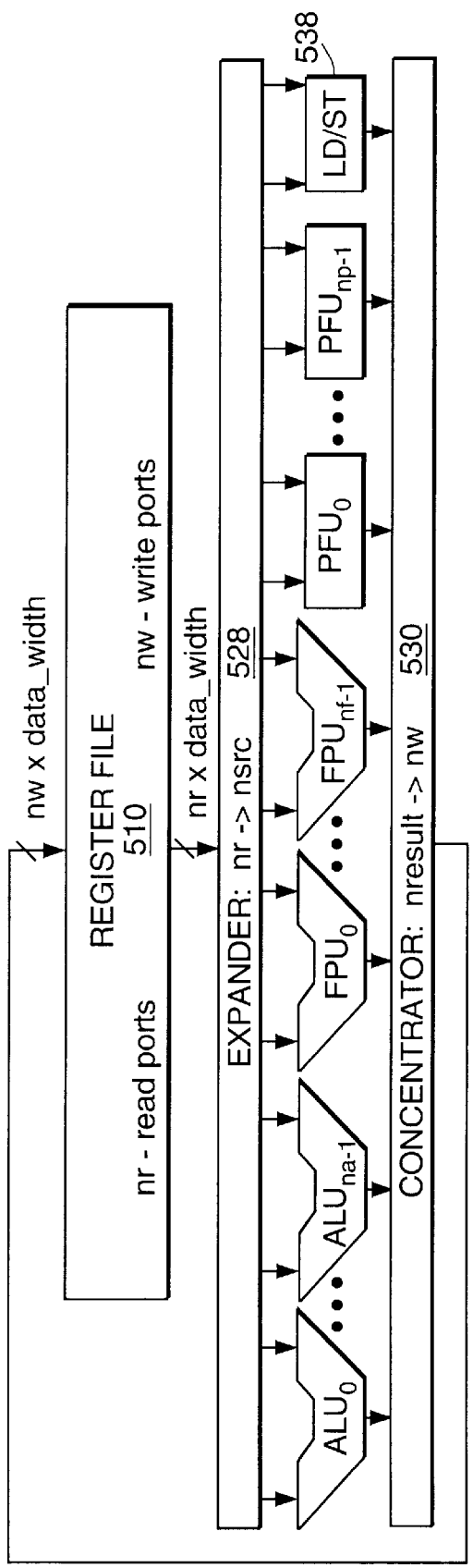
FIG. 1D shows an implementation in which the PFU's are connected in parallel with other functional units such as fixed processing units (FPU's) and ALU's between an expander 528 and a concentrator 530.

More complex integration issues arise in the context of today's high-end microprocessors. These devices generally have multiple, fixed processing units (FUP's), exploiting parallelism to increase throughput. In these superscalar and VLIW configurations, the programmable function unit (PFU) takes its place alongside the FPU's. FIG. 1D shows the general organization of the processing core of such a superscalar or VLIW processor constructed according to the present invention. FPU's $_{0-(np-1)}$ reside in parallel with more conventional functional units such as ALU's $_{0-(na-1)}$ and FPU $_{0-(nf-1)}$. Expander 528 and concentrator 530 blocks abstract away the large range of datapath sharing which could go into an implementation. As with the simpler examples of FIGS. 1A, 1B and 1C, the number of register file ports can be conserved by sharing them among functional units at the expense of restricting the options for parallel operation.

Table 1 summarizes the parameters included in the register file 510 and fixed unit datapath shown in FIG. 1D.

TABLE I

| | |
|---|---|
| nr | RF read ports |
| nw | RF write ports |
| na | Number of ALUs |
| nf | Number of FPUs |
| np | Number of PFUs |
| $nsrc_{alu}$ | Number of sources expected into each ALU |
| $nsrc_{fpu}$ | Number of sources expected into each FPU |
| $nsrc_{pfu}$ | Number of sources expected into each PFU |
| $nresult_{alu}$ | Nunber of results generated by each ALU |
| $nresult_{fpu}$ | Number of results generated by each FPU |
| $nresult_{pfu}$ | Number of results generated by each PFU |
| nsrc | Number of source paths into functional units |
| | $nsrc = nsrc_{alu} \cdot na + nsrc_{fpu} \cdot nf + nsrc_{pfu} \cdot np + 2$ |
| nresult | Number of results generated by functional units |
| | $nresult = nresult_{alu} \cdot na + nresult_{fpu} \cdot nf + nresult_{pfu} \cdot np + 1$ |

The Table assumes a single load/store unit taking in a single address-data pair and generating a single data result. Of course, multiple load store units with varying input/output interfaces are also possible. Note, read port sharing will be necessary in the expander 528 when nsrc>nr. Similarly, as long as nresult>nw, write port sharing will be necessary in the concentrator 530.

Figure 1E:
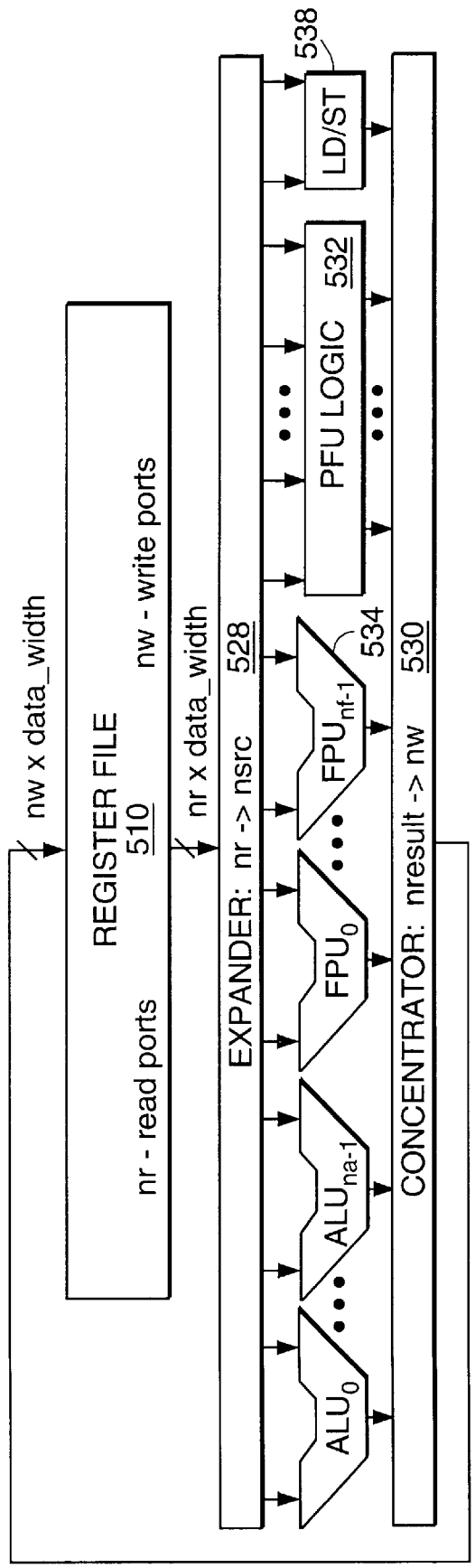
FIG. 1E shows another implementation in which the multiple PFU's have been replaced with a single large PFU 532.

It is also worth noting that it is generally better to share the logic among PFUs. Consequently, rather than designing the processor with independent PFUs as shown in FIG. 1D, alternatively one large PFU 532, perhaps np times as large as a single PFU 514, is used as shown in FIG. 1E. This large PFU 532 is provided with np(nsrc $_{pfu}$) and np(result $_{pfu}$) inputs and outputs. This also give the PFU 532 additional flexibility in utilizing its RF read and write bandwidth.

Figure 1F:
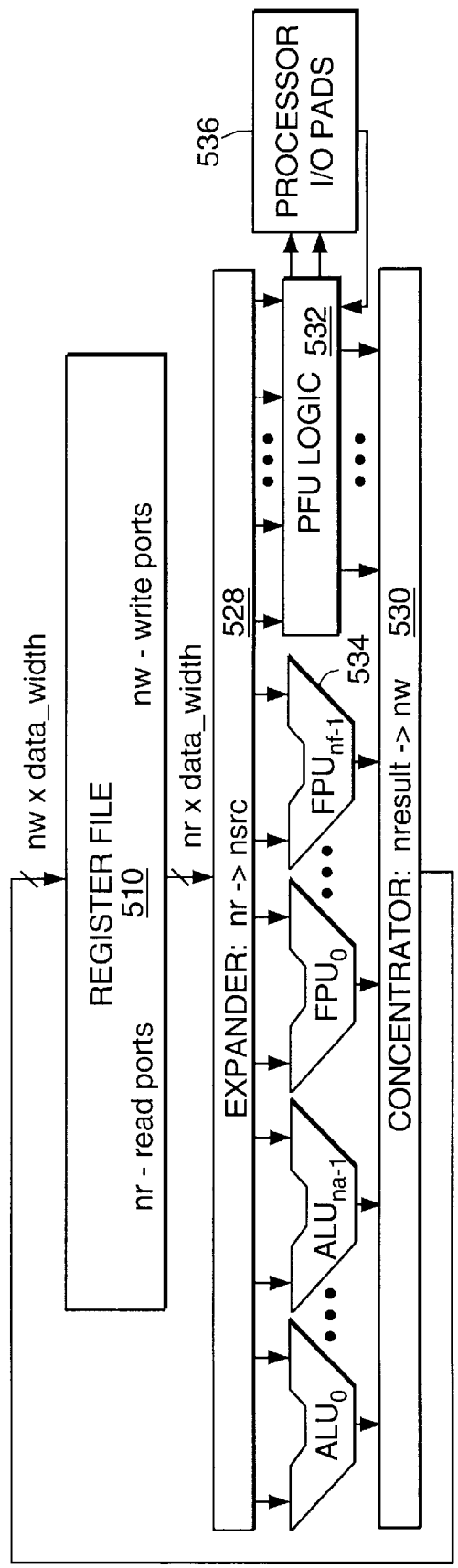
FIG. 1F shows an implementation in which the PFU logic 532 subsumes the load and store unit (LD/ST) 538 of the processor.
Figure 1G:
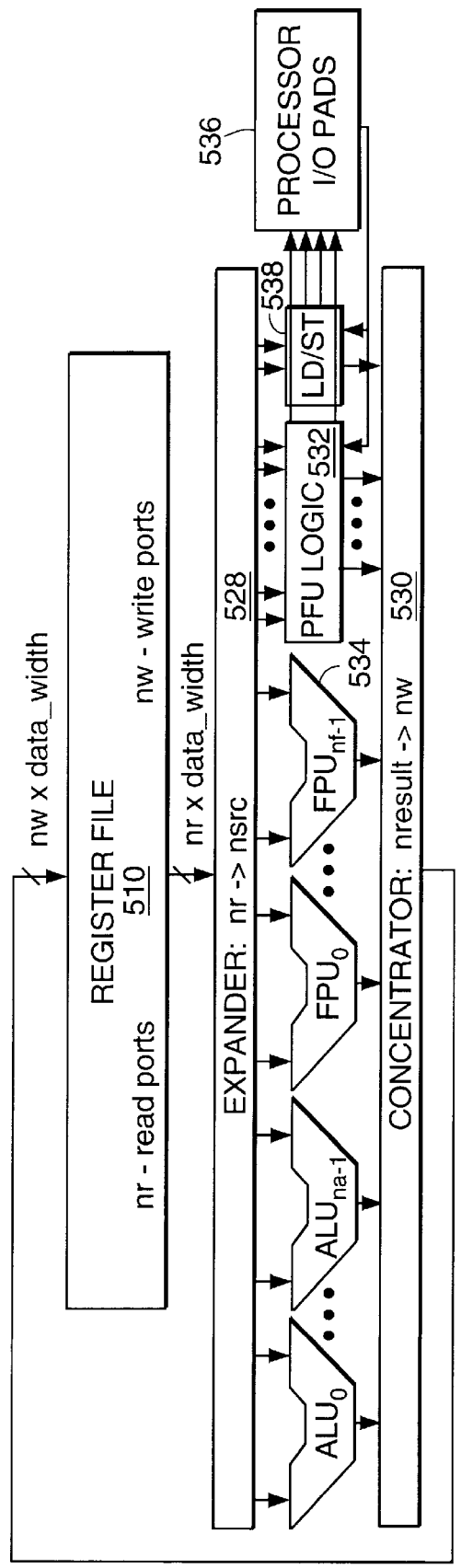
FIG. 1G shows another implementation in which the PFU logic 532 is connected in parallel with the LD/ST 538 to the i/o pads.

As shown by FIG. 1F, in designs where flexible input/output (i/o) is also desirable, it may be beneficial to merge the PFU reconfigurable logic 532 with i/o reconfigurable logic. Here, the load/store function is subsumed by reconfigurable logic 532 in the connection to the i/o pads 536. FIG. 1G shows an alternative implementation in which fixed load/store 538 and programmable logic 532 exist in parallel.

Timing control issues are created by the addition of the configurable logic. Assuming the processor runs at some fixed rate independent of the function implemented in the PFU, the logic coupling may have to deal with various timing situations which are possible in the PFU:

Single cycle latency, Single cycle throughput—In the simplest case the PFU function may operate within the standard pipeline clock period of the processor.

Multiple cycle latency, No new operations while operation in progress—In some cases the latency of the PFU operation may be multiple clock cycles. In the simplest multiple cycle case, the processor will not be able to issue a new operation until the previous operation completes.

Multiple cycle latency, Single cycle throughput—If the programmed function is pipelined, the processor may still be able to issue a new operation every cycle.

n-cycle Latency, Launch every m-cycles—In the general case, the processor may be able to launch a new operation every m cycles, while the operation completes n cycles after launched.

Multiple Latency Function—Sometimes a PFU may implement several functions with differing, but predictable latencies.

Variable Latency—Some operations may have data dependent latencies.

Most of these cases are handled in the same way analogous cases are already handled in processors. The main difference is that fixed functional units fall into one of the categories which is known at design time, whereas the category of the PFU's will depend on the function being implemented and hence will not be known until the function is configured.

Predictable delay constraints are schedulable in software. That is, the compiler guarantees to only emit code which will launch a new operation every m-cycles and expects the result of an operation to only be available after m-cycles. The compiler will know the PFU function when generating the code to accompany it, so can arrange code appropriately to handle the specifics of a particular PFU.

Figure 1H:
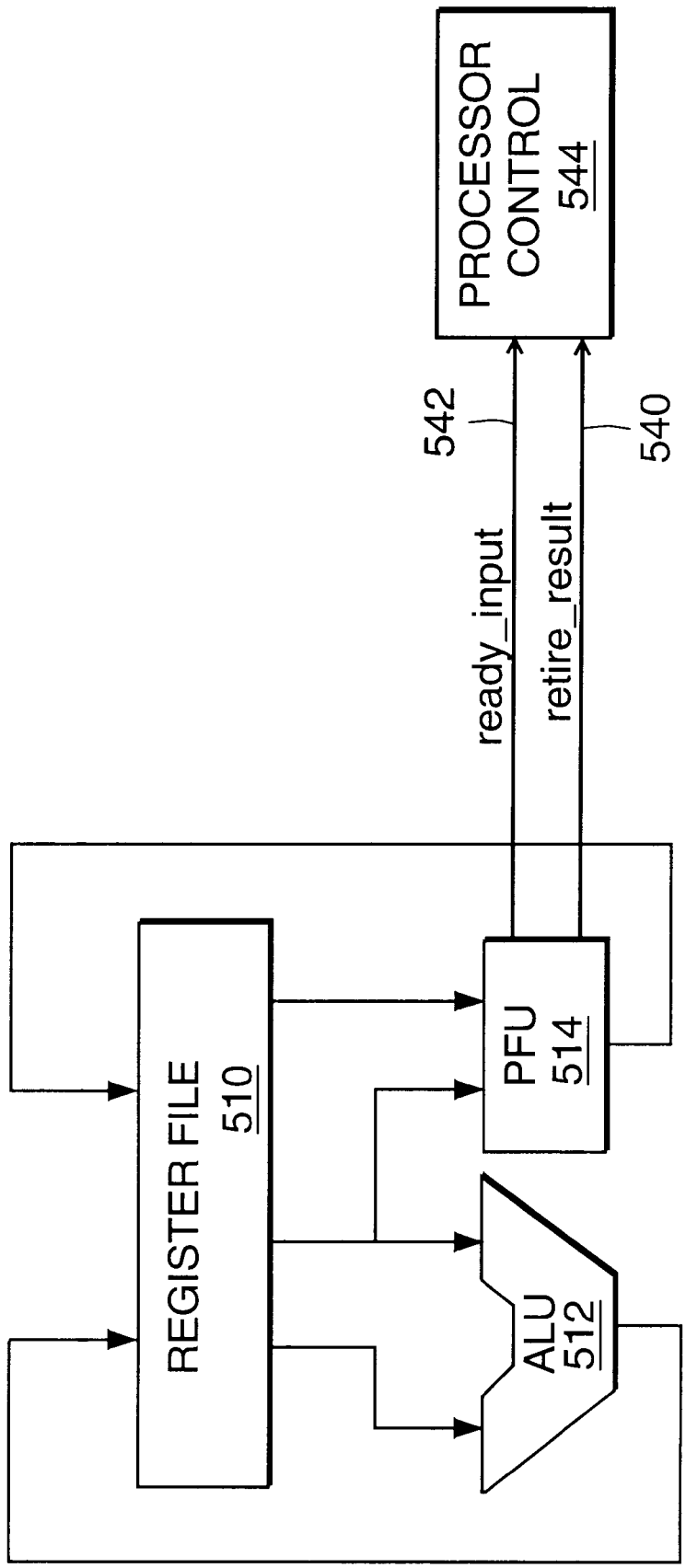
FIG. 1H shows a PFU 514 generating two control signals that indicate when a logic calculation is complete and when the PFU is ready for a new input.

As shown in FIG. 1H, to support variable times, the processor control logic 544 can accommodate ready and busy signals from the programmable logic of the PFU 514. Here, the PFU has a pair of extra signals, one to indicate when the result is done (retire_result) 540 and one to indicate when the PFU is ready (ready_input) 542 for the next operation. These control signals 540, 542 generated from the PFU 514 can be customized with each PFU configuration. The controller 544 then stalls the pipeline when the PFU 514 is not ready for input. Similarly, it can use the result completion signal 540 to determine when to writeback the result and when to stall dependent computation. The processor control 544 could, for example, use a standard register score-boarding strategy to force the processor to stall only when the instruction stream attempts to access the PFU result before it is generated.

Ready_input 542 is asserted whenever the PFU 514 is ready to receive a new input. Retire_result 540 is asserted when the PFU 514 completes each operation. The processor control 544 stalls the pipeline if ready_input 542 is not asserted when the next operation in the pipeline requires the PFU 514. The processor control 544 uses retire_result 540 to recognize when a result is done and make sure writeback occurs to the appropriate target register at that time. When the PFU instruction is issued, the result register is marked unavailable. If the processor control 544 encounters any reads to unavailable registers, it can stall the dependent instruction awaiting the writeback which makes the value available.

Of course, a particular processor could choose to restrict the kinds of variability allowed to simplify control. Implementations could restrict themselves to no variability or to variability only in launch rate or completion latency.

In some applications, other hooks into the processor's control flow may be merited. In particular, there are a number of applications where it would be beneficial to give the logic an option to divert program flow rather than simply stall it. Two general classes are:

Exception/assumption detection—The processor code could be compiled assuming certain cases do not occur. The PFU could then be programmed to watch values and detect when these exceptional cases occur, diverting the processor's control to handle the exceptional case accordingly. For example, compiled code could be written to assume a certain address range is never written, allowing the values to be cached in registers or even compiled into the code. The PFU then performs parallel checking to see that this assumption is met throughout the region of code. In a similar manner, the PFU might be programmed to watch for specific address writes to facilitate debugging.

PFU limitations—Similarly, the PFU may implement a restricted version of some function—perhaps one that only works for certain values. When unusual values, those not handled by the PFU, are detected the PFU could divert control flow to software which implements the function.

As described, flow control diversion can be activated by a line which signals a synchronous exception vectored into a handler designed to handle the specified exceptional event. Alternately, the line could set dirty bits in the processor state, thread state, result registers, or the like to indicate that the computed value was incorrect and should be ignored. Such a line might also inhibit memory writes or other side-effecting operations which might write incorrect results based on the violated assumptions.

In some cases it may be useful to place specialized control registers inside the PFU. For example, for a DPGA PFU it might be beneficial to have a dedicated context state register for the array inside the PFU. This would be particularly advantageous if the PFU performed multiple cycle functions in the same PFU, but the processor did not want to allocate register file or instruction bandwidth to feed the context identification into the PFU on every cycle. Some internal registers may be beneficial anytime when the PFU operates on logical input data larger than its register file datapath. Internal registers can always be built out of the programmable logic where need exists.

So far, scenarios where the PFU simply takes data from the register file datapath have been described. A control signal into the PFU may be helpful to indicate when new data is valid and destined for the PFU. Of course, if the PFU can always operate on the data it is provided and the processor only takes results from the PFU when it expects the PFU to generate results, such control is not strictly required. However, if the PFU is tied up for multiple cycles with each operation, as suggested in some usage scenarios above, the PFU needs to be told when it actually needs to start operating on data. Additional control signals might tell the PFU more about what to do. For example, if a PFU is setup to perform more than one operation, the PFU might get some instruction bits to specify the current operation. Similarly, control bits might inform the PFU about the kind of data it is now receiving via its register file inputs. This information would be particularly valuable if the PFU operated on more data than it received over the register file datapath in a single cycle and did not always get all of the data it operates on reloaded in a deterministic sequence.

The processor sequencing and control can also be viewed as an orchestrator, coordinating dynamically programmable-gate array (DPGA) or SIMD logical operations occurring within the PFU. This view is entirely consistent with the general scheme presented here. A processor designed specifically with this in mind is likely to include more PFU logic and less fixed ALUs. In fact, the fixed ALUs might exist primarily for addressing, control branching, exception handling, and configuration loading.

The primary application for the programmable functional unit model is, of course, as special purpose functional units adapted to a particular application. Operations which are executed frequently in the application, but poorly supported in the fixed processing units, can be implemented in the PFU to accelerate the application.

One class of operations for the specialized functional unit is support for efficient data filtering. When the processor needs to process large amounts of data looking for certain characteristics, the PFU can be programmed to identify the desired characteristics allowing the processor to rapidly walk over large data-sets. This kind of support is likely to be valuable in database and transaction processing applications.

As noted above, the PFU can also be used for assumption checking and error detection in support of speculative and common-case execution on the fixed or programmable functional units.

PFU's implemented with fine-grained logic (e.g. FPGA's or DPGA's) can very efficiently take advantage of fine-grained, application-specific parallelism. This kind of parallelism is handled particular poorly with traditional, fixed, wide ALU's.

State can also be built up inside the PFU. The PFU can thus be used to maintain specialized state adapted to a particular application. Further, the PFU can implement logic to efficiently update that state as new data is collected or events occur. For example, the PFU could implement a pseudo-random number generator, maintaining the pattern state internally as well as computing functional updates. A wide range of statistics collection could also be implemented this way. The processor could fire data values at the PFU, and the PFU would use the new data to update its statistical residues to be retrieved by the processor once the monitoring period ends.

In summary, the programmable functional unit (FPU) arrangement is primarily aimed at increasing the performance of the processor by allowing the inclusion of application specific acceleration logic. This coupling also makes some operations feasible which are conventionally infeasible. Operation and value checking can support debugging. Lightweight data collection and maintenance can facilitate minimally intrusive profiling and monitoring.

2. Configurable logic as control logic

Every traditional microprocessor has logic which controls the flow of instructions and data. This logic usually accounts for a very small portion of the silicon area on the processor die, but plays a large role in establishing how the processor behaves and what it does efficiently. Direct hooks into this logic allow reconfiguration of the basic processor behavior. The hooks range from allowing reconfigurable logic to drive into selective fixed-logic signals to replacing the fixed control logic with a reprogrammable substrate. The latter offers more flexibility while the former allows faster and smaller implementation of standard control structures. Just like the flexible input logic, default, hardwired control logic can be wired in parallel with reconfigurable logic to give some elements of both schemes.

In general, reconfigurable logic is adaptable to monitor:

1) various data and address lines on the chip—the logic may use these inputs to detect unusual events or assumption violations;
2) cache miss, conflict, TLB miss lines, read/write control lines, processor stall, pipeline flush, branching, branch prediction, mispredicted branch— access to these signals will be particularly useful when the reconfigurable logic controls behavior in exceptional cases like, cache or TLB misses; and
3) i/o's—direct access to the i/o's is beneficial in adapting the processor to a system and the devices with which it is operating—this kind of access on some i/o signals is useful for adapting control and signaling even if the primary i/o buses are not reconfigurable.

All of these lines can be monitored for profiling, debugging, and statistical purposes.

When reconfigurable control logic is arranged in this manner, the processor's behavioral patterns can be revised. In some cases, this may allow the reconfigurable logic to control what happens on exceptional events like traps, cache misses, TLB misses, or context switches. It may also allow the instruction stream to make more or less stringent assumptions about the data and provide a means of checking these assumptions and handling the data accordingly.

Among other things, this may allow the processor to be adapted to match the semantics desired by a particular operating system or operating environment. In many modern systems, the operationing system (OS) ends up executing many instructions to switch contexts, take traps, or save/restore registers because the processor does not quite provide the right hooks to match the OS semantics. Reconfigurable control can provide an opportunity to make up for semantic gap at the processor level, rather than incurring large software overheads to emulate the desired semantics.

In general, the control logic on the processor is the hardest part to get correct. The various exceptional and hazard cases, and their interactions, are difficult to handle well and correctly. Sometimes it is difficult to decide what the correct behavior should be. With highly reconfigurable control logic, the binding time is deferred, allowing the logic to be fixed after the processor is fabricated and allowing the behavior to be revised without spinning a new design.

FIG. 2 schematically illustrates a second embodiment of the present invention in which configurable logic is adapted to perform control operations. In the first embodiment, the reconfigurable array 100 was analogized to an on-chip co-processor or function unit in which the array 100 was configured to perform specific high-level tasks. The second embodiment is built upon the benefits associated with even more closely integrating the configurable array 100a into the processor cell. Specifically, the reconfigurable array 100a is provided in close association with an instruction cache 16, and a data cache 22 for direct accessing. Also, a register file 20 and the fixed logic unit 18 are directly accessible by the array 100a.

Figure 2A:
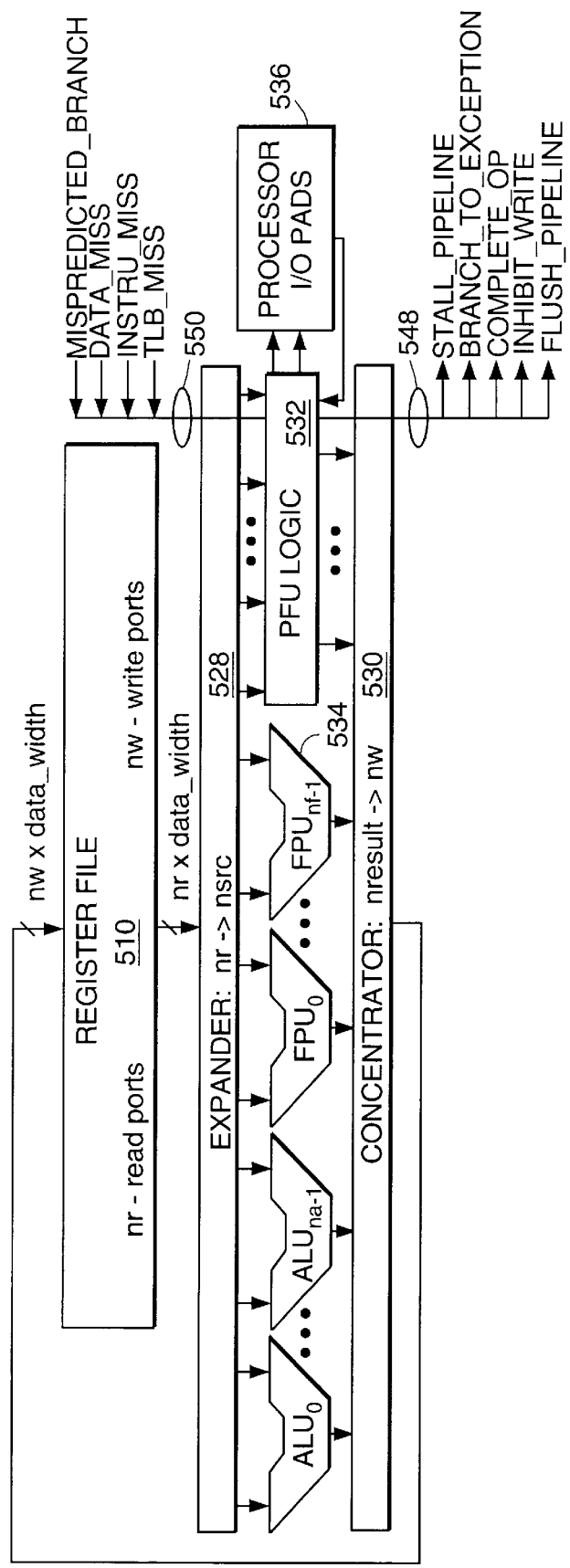
FIG. 2A is a schematic diagram showing one implementation for enabling configurable logic to operate as control logic for the processor.

FIG. 2A shows one implementation for enabling configurable logic to operate as control logic for the processor. The basic processor datapath with a reconfigurable logic block serving as a PFU and reconfigurable i/o introduced in FIG. 1F, for example, is utilized. Hooks 548,550 are further included, however, into the processor's control logic.

Using these hooks, the processor's behavior can be modified, allowing it to be tuned for the characteristics of a particular application or adapted to provide particular semantics and instruction interpretation. Direct hooks allowing reconfigurable hardware to monitor on-chip signals support a wide variety of low-overhead profiling which is currently impossible. Key, on-chip, lines and datapaths can be monitored with event computation and handling processed directly in PFU logic 532. Simple statistical gathering can update state in the reconfigurable logic without perturbing processor operation. Coupled with sufficient hooks into the i/o, the logic is connected to store events off to memory without interrupting the processor's execution. More elaborate schemes can use the reconfigurable logic 532 to detect events then divert program flow to allow the processor to run code to further handle the event.

Combining control of processor flow with event monitoring, the FPU logic 532 can be used to provide rich debugging support. Breakpoints can be set based on internal processor state. Customized action can even be defined to snapshot and preserve previous state when targeted events occur.

On chip access to internal signals is moderately inexpensive. However, limitations in off chip bandwidth make it impractical to route internal signals off chip for observation or control. On-chip reconfigurable logic makes it possible to access these signals economically.

Instruction Interpretation FIG. 2B is a more detailed diagram showing the reconfigurable array 100a serving as a reconfigurable decoder for the instruction cache 16. Specifically, a program counter 552 provides instruction addresses to the instruction cache 16. The instructions are provided to the reconfigurable array 100a configured as a decoder. The reconfigurable logic 100a interprets the instruction stream, controlling the operation, effectively taking the place of the fixed decoder.

Alternatively, the reconfigurable logic 100a can turn the instruction into a sequence of primitive operations and control their flow through the processor. This is much like traditional microcode, except that the control is implemented in the reconfigurable logic rather than a microcode PROM.

FIG. 2C shows a hybrid scheme. Here, the reconfigurable decoder 100a generates only a portion of the control signals 554. The hybrid flexible/hardwired scheme provides direct paths for common operands such as register file addresses, while the reconfigurable logic asserts complete control over operation interpretation and control signals.

Code Expansion—the code can also be expanded from a denser, memory efficient form, into a larger, more workable form when stored in the I-cache 16. Principles of code expansion were disclosed by David Ditzel, Hubert McLellan, and Alan Bernbaum, "The Hardware Architecture of the CRISP Microprocessor," The 14th International Symposium on Computer Architecture, pages 309–319, ACM/IEEE, IEEE Computer Society Press, June 1987 which is incorporated herein by this reference. According to this operation, the instructions returned from the I-cache 16 are thus expanded instructions which directly control the on-chip resources.

Flexible instruction interpretation allows the processor to be adapted to efficiently decode and run operations. The flexible logic decodes the provided instruction stream and reformulates them into the control structures for the processor. In general, this may require expanding some instructions into multiple operations on the core processor, for example.

The instructions can also be customized to the application by the decoder 100a. This can be used to compress executables by adapting the instruction encoding to the application instruction usage. As a simple example, the optimal Huffman source coding could be derived for binary, then the instruction encoding revised accordingly. Of course, more sophisticated recodings will provide greater benefits.

Customized instruction decoding is complimentary with the other reconfigurable structures introduced here, allowing adaptation of the instruction stream to directly accommodate new instructions and behaviors made possible by the reconfigurable logic.

Basic Processor Architecture A classic question in processor architecture is: where should a given resource be deployed. Should the cache be larger/smaller relative to the TLB? Do we allocate space to prefetch or writeback buffers? How much memory should go into the data cache, instruction cache, scratchpad memory? Do we include a branch target buffer or victim cache?

A second question which comes along with this one is: How do we manage the limited resources? What's the prefetch/reload/eviction policy?

The traditional solution to both of these questions is to make a static decision at design time which does, in some sense, reasonable well across the benchmarks the designers consider representative. This inevitably leads to compromise for everything, and for many applications the magnitude of the compromise can be quite large.

According to the present invention, some flexibility is left in the architecture so the machine can be configured to deploy the resources most effectively for the given application. The idea is to build specialized pieces of hardwired logic with common utility (e.g. memories, ALUs, FPUs), but rather than completely hardwiring the control and datapaths, flexibility is left to reorganize their interconnect and hence use.

Figure 2D:
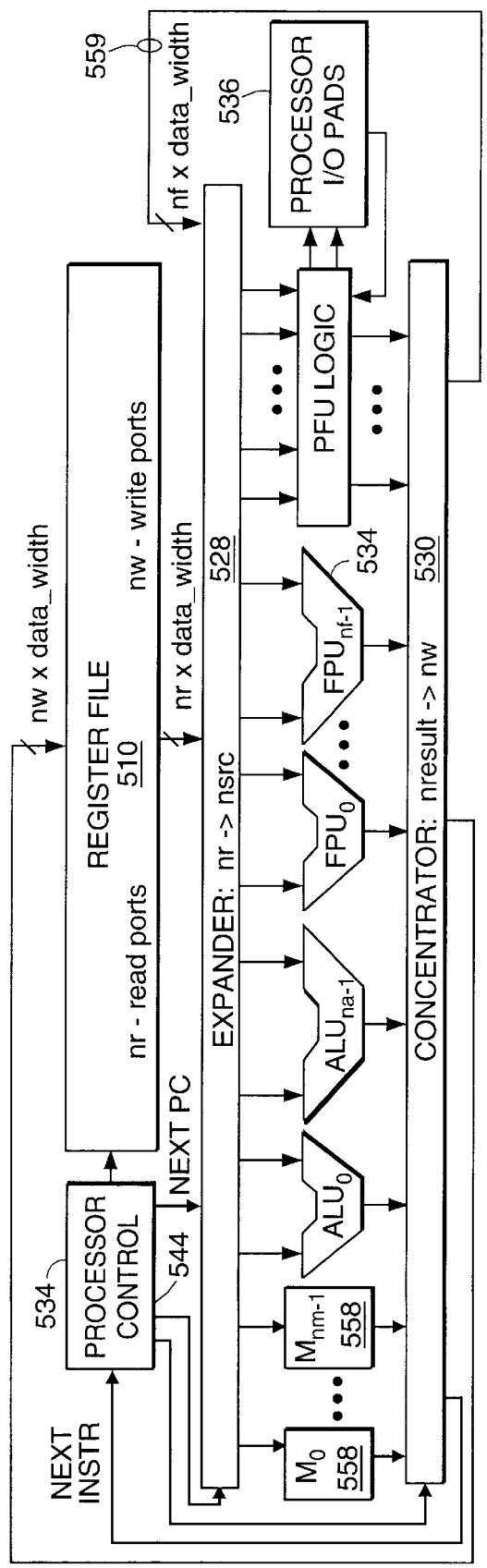
FIG. 2D is a schematic diagram of the VLIW processor architecture in which configurable memory blocks have been added to the collection of processing resources.

FIG. 2D, for example, shows a revision of the VLIW processor architecture is introduced in FIG. 1D. Blocks of configurable memory $M_O$–$M_{nm-1}$, have been added to the collection of processing resources. Here, some outputs from the ALU/PFU/FPU/memory bank are routed back to the expander 528 to allow cascaded operations via line 559. For example, a virtual memory address coming out of a register in file 510 may be translated through a memory before being feed to the i/o 536. Similarly a base address from one register may be added to an index from another before the address is fed in as an address to a cache. To facilitate this, additional outputs are added from the concentrator 530 and inputs to the expander 530, in addition to the additional concentrator inputs and expander outputs entailed by the additional memory units $M_{O-Mnm-1}$ 588 they support.

Additionally, the memories $M_O$–$M_{nm-1}$ can be arranged in standard sized chunks which can be composed, allowing the memory resources 558 to be shuffled at a moderate granularity. For example, each basic memory could be a 2K×8 memory chunk. 4 or 8 of these can be grouped together to build a 32- or 64-bit wide memory. Additionally, they can be cascaded to build deeper memories.

With a little bit of additional control logic, these memories can be used as caches, cache-tags, TLBs, explicit scratchpad memories, FIFO buffers, or the like. These memories can completely subsume the separate data cache 22 shown in our original processor model of FIG. 2.

Systems that do not use a TLB can reallocate memory blocks 558 to the cache. Applications with more or less virtual memory locality can adjust the size of the TLB accordingly. Applications with known data access can use explicit scratchpad memory, reallocating the memory blocks 558 holding cache tags to data storage. Applications with specific spatial locality in data or instructions can build logic to prefetch data according to the application need.

Figure 2E:
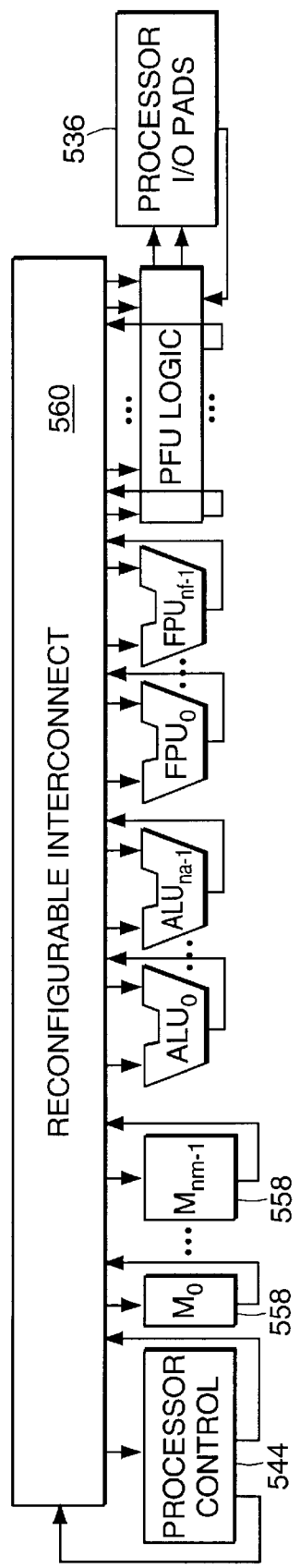
FIG. 2E is another schematic diagram showing an implementation in which the register file 510 is constructed from deployable memory units 558.

FIG. 2E shows another implementation in which the register file 510 of FIG. 2D is viewed as another memory which can also be built out of the deployable memory units 558. Thus, there is no a priori designated register file. This allows, for example, the reconfiguration of the register file width, depth, and number of simultaneous read ports. Further the register file can be broken into a series of smaller register files where appropriate. Here, the expander/concentrator is collapsed into a single reconfigurable interconnect 560.

Alternately, the register file may want to be a slightly specialized memory unit, but still be deployable for the reasons articulated here. As noted above, width, depth, and read cascading are moderately easily constructed by paralleling memory blocks just as in building basic memory structures. What is harder to build by composition is multiple write ports, and register files often depend heavily on a number of simultaneous write ports. For this reason, it may make sense to also include a different kind of memory block with multiple write ports to allow efficient construction of register files, as well as other structures requiring simultaneous write support.

The configuration shown in FIG. 2E shows hardwired processor control 544 and a completely reconfigurable i/o unit 536. Of course, variations could implement all or much of the control in reconfigurable logic and/or include hardwired load/store units.

Note that the reconfigurable interconnect 560 used to interconnect functional units differs both from the fine-grained reconfigurable interconnect typically employed in FPGAs and the expander/concentrator interconnect used in a pure VLIW. Rather, it is a hybrid of the two. Unlike traditional FPGA interconnect, most of the operations with the interconnect 560 are bus oriented. Therefore, buses are switched in groups. Most buses may be some nominal processor bus width (e.g. 16, 32, 64). Some will be able to compose or decompose these buses to other interesting sizes (e.g. 1-bit entities for fine-grained logic, 8-bit entities for reconfigurable memories). In a traditional VLIW, the decoding of the instruction specifies the configuration of buses. With this kind of a setup, the instruction bandwidth would be excessive if fully configured from the instruction stream. Similarly, the interconnect pattern would be too rigid if fully configured via FPGA style programming. Here, the configuration of buses will depend partially on the instruction executed and partially on the way the system is currently configured. In most scenarios the decoding between the instruction stream specification of interconnect and the full interconnect specification would be done in the reconfigurable logic. For efficiency, the reconfigurable logic serving this purpose might be tailored somewhat to this application.

Figure 2F:
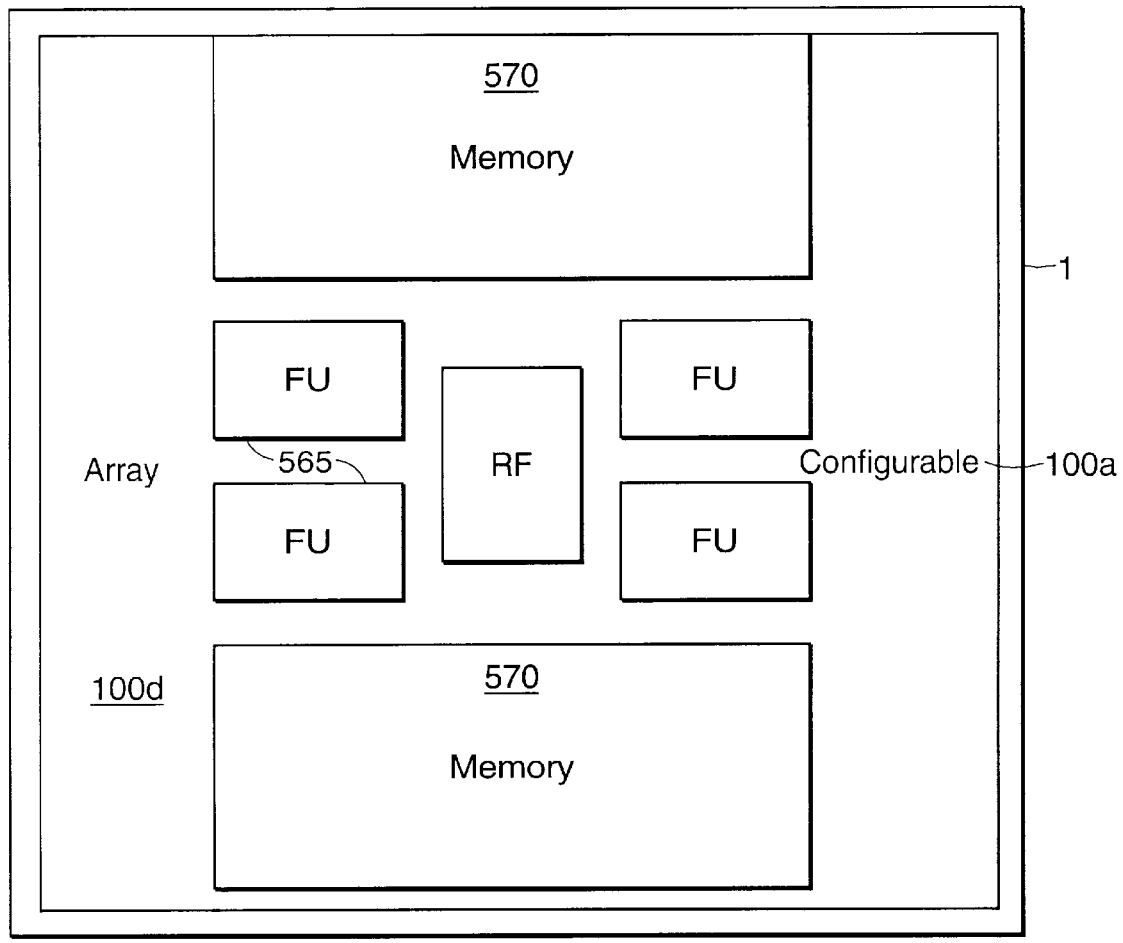
FIG. 2F schematically shows a revised model for a computing device in which functional units and memory are embedded in configurable array.

This finally leads to a revised model for a computing device shown schematically in FIG. 2F. Here, basic, specialized functional units FU 565 (e.g. ALUs, FPUs, MDUs, LD/ST units, DMA logic, hardwired control units) and memory arrays 570 are embedded in a reconfigurable interconnection 100*a* along with regions of reconfigurable logic which can be used for monitoring, control, i/o, decoding, and as PFUs. This device 1 gains the performance and space advantages of hardwired logic units for commonly used operations. At the same time, it gains performance advantage over a purely fixed microprocessor by adapting the processor organization much more tightly to the application.

As noted, limited resources can be deployed where they most benefit the application or system using the processor rather than being statically deployed according to aggregate statistics across all applications and systems.

Datapaths can be organized to match the application requirements. For example, ALUs and register ports can be cascaded to operate on wider data efficiently. Also, data can flow directly from one functional unit to another without an intervening store into and read from the register file.

Perhaps as a special, well understood, case of application-specific datapath and resource arrangement, systolic arrays or pipelines of functional units can be arranged allowing data to flow through standard sequences of operations and adapting the processor to exploit task-specific parallelism.

In general, deployable functional resources allow the processor to structure the parallel operations in accordance with the application. Applications with high, static parallelism can schedule resources staticly for parallel operation. Applications suitable to pipelined parallelism can be organized in that manner. Applications with heavy dynamic dependencies can allocate part of the resources to detecting conditions under which serialization is necessary. With the addition of reconfigurable control, resources management characteristics can be tuned to the application.

3. Reconfigurable logic providing flexible i/o

Figure 3:
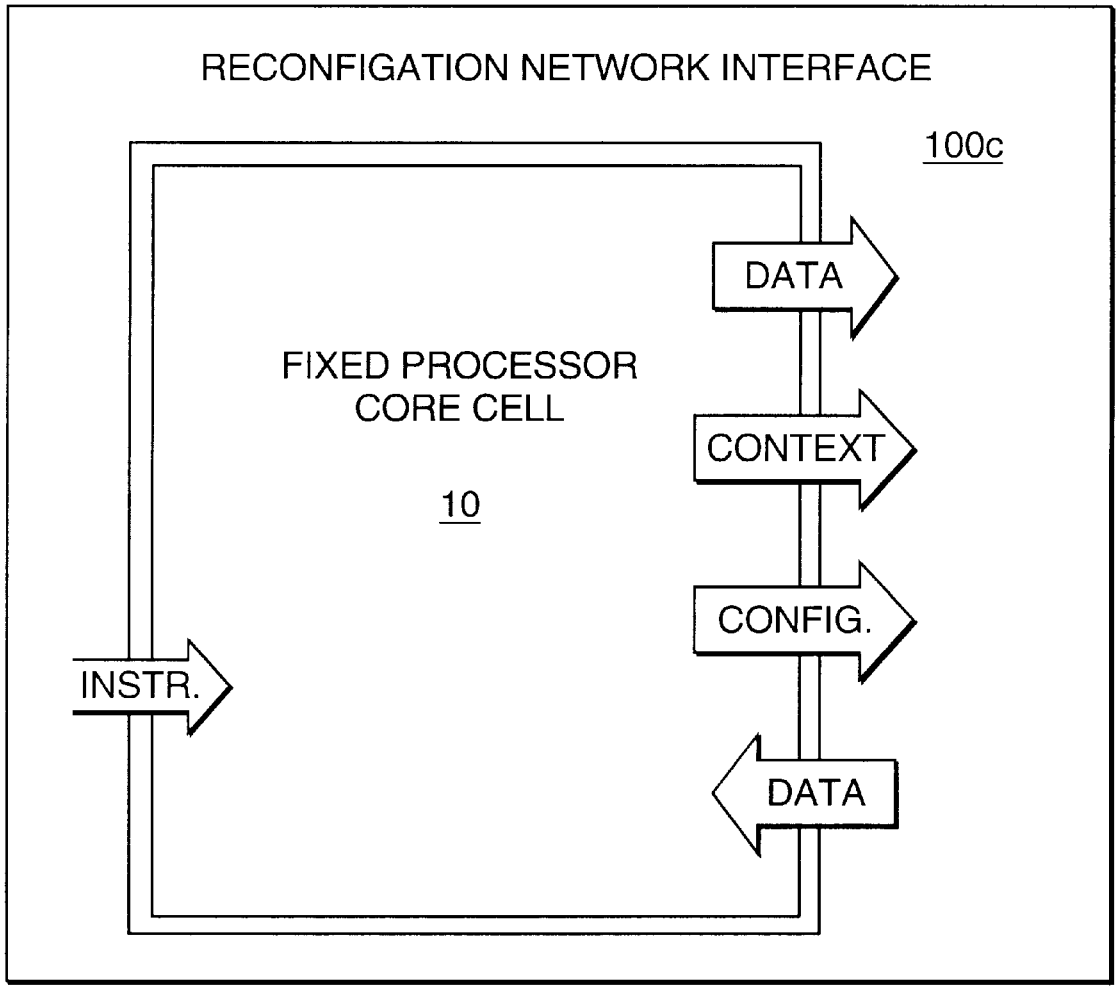
FIG. 3 is a block diagram of a third embodiment of the microprocessor of the present invention in which a reconfigurable network interface is provided to format data for the core processor cell and format data from the core cell to the surrounding network.

FIG. 3 illustrates a third embodiment of the present invention. In this case, the reconfigurable array 100*c* functions exclusively as a configurable network or i/o interface. In operation, the network interface 100*c* is bidirectional to format data and instructions received from a network including peripheral devices, into a format for which the processor core cell 10 is designed. Further, output data from the processor 10 is transformed into a format that the surrounding network expects. This embodiment is most useful in situations in which the core processing cell is designed and built without specific knowledge as to the network in which it will operate. The interfacing reconfigurable logic 100*c* is then be reconfigured by the network or by the processing core cell to perform the proper interfacing roles to enable the core cell's logic 10 to fluidly interact with the network.

Figure 3B:
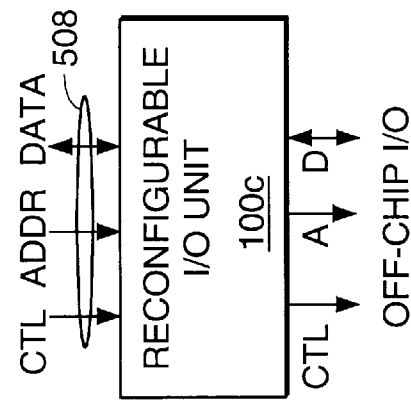
FIG. 3B is an implementation in which the off-chip i/o is completely subsumed by the configurable logic 100c.
Figure 3A:
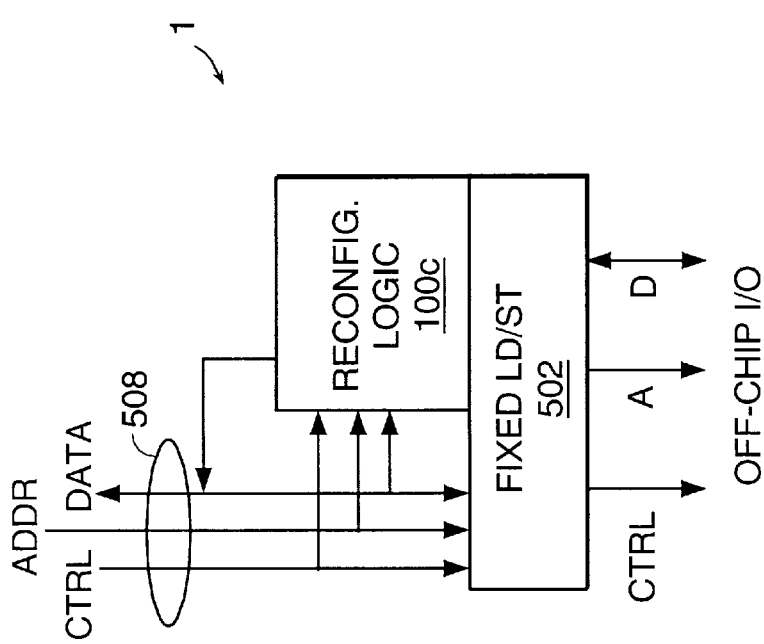
FIG. 3A is a block diagram of a specific implementation of the third embodiment in which configurable logic is integrated into the i/o operations.

FIG. 3A is a block diagram showing a specific implementation of the third embodiment showing the integration of the reconfigurable logic in the i/o operations. Specifically, control CTRL, address ADDR, and data lines from the on-chip buses of the microprocessor cell 10 are received both at the reconfigurable logic 100*c* and the fixed load and store registers 502. As a result, data from the processor cell 10 can be provided off-chip either directly to the fixed load and store registers 502 or alternatively through the configurable logic 100*c*. In a similar vein, data received by the configurable logic-coupled processor 1 can be alternatively provided directly onto the on-chip buses to the processor cell 10 or alternatively to these buses through the configurable logic 100*c*.

Arranged appropriately, the latency impact on i/o operations which do not make use of the reconfigurable logic can be minimal—just an extra multiplexor delay in each path. When the reconfigurable array 100*c* processes data on its way on or off chip, the reconfigurable processing can be pipelined with processor and i/o operations. The reconfigurable operations will increase the off chip latency, but not diminish bandwidth. Of course, in the configurations of interest the additional latency in input or output processing will be small compared to the latency which would be incurred if the processing had to be done in software using the fixed portion of the processor 10, itself.

FIG. 3B shows an implementation where the off-chip i/o is completely subsumed by reconfigurable logic 100*c*. That is, the only path 508 to the on-chip buses of the processor cell 10 and the off-chip i/o is through the reconfigurable unit 100*c*. Note that the relatively low-bandwidth associated with off-chip communications, compared to on-chip communication, can partially compensate for the slower native performance of reconfigurable logic. The datapath between the fixed processing core 10 and the reconfigurable logic 100*c* can be large, allowing the reconfigurable logic 100*c* to use parallelism to achieve reasonable off-chip i/o bandwidth.

Further, the performance hit due to reconfigurable logic 100C may often be lower than the performance hit taken when external logic components must be inserted into the datapath to adapt the processor's i/o to a particular system.

Similarly, one might worry that the reconfigurable structure 100C will take more die area than the non-reconfigurable i/o. While the reconfigurable i/o may be larger, the increase in system cost which comes from having a larger die may well be less than the increase in system cost which comes from adding an external IC to adapt the conventional processor to fit into a particular system.

Figure 3C:
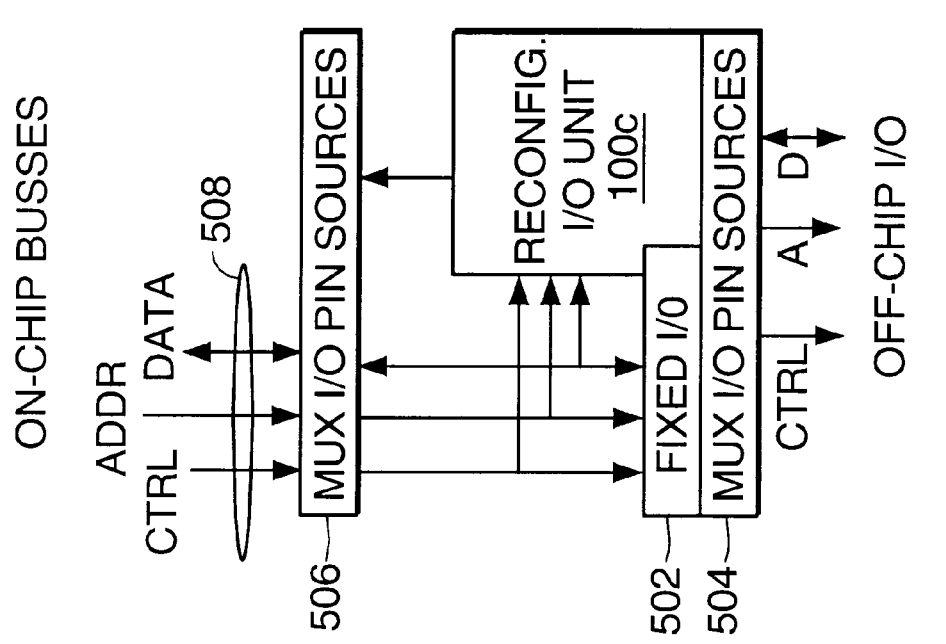
FIG. 3C shows another implementation which provides full configurability but allows the reconfigurable i/o unit 100c to be by-passed with little speed degradation.

FIG. 3C shows another implementation combining aspects of both FIGS. 3A and 3B. Placing multiplexors 504,506 both on the i/o pins themselves and the internal datapath 508 allows the preferred bus to suffer very minimal speed degradation while allowing full reconfigurability of the i/o interface. This might be interesting, for example, in building a single IC to span a large range of systems. The fixed bus structure 502 might be tuned to the highest end product line. The lower end models could employ the reconfigurable logic 100C to adapt the core to their systems. This configuration would be particularly ideal if the lower end systems were cheaper particularly because they ran the external buses at a lower speed than the high end models.

The configurable i/o capability can be employed in a number of scenarios:

Standard bus lifetimes are shortening and market windows are tight. Currently, to integrate native support for some standard bus on a processor (e.g. PCI, VESA-VL, MBUS), the market must be predicted during CPU design (12–18 months before product launch). A bad guess runs the risk of losing out on important design-ins. Additionally, the processor's lifetime may end up being truncated by the next trendy standard. Reconfigurable i/o allows adaptation to popular standards. It also allows a system designer the ability to build one card or mother board which is soft configured for the bus of choice.

In the present setting, one cannot get native bus support for buses which lack widespread industry popularity. With reconfigurable i/o, the processor can be adapted for direct connection to any bus system. This is particularly useful in mixed processor environments and in legacy system and application environments.

A reconfigurable i/o interface can be tuned to the characteristics of a particular system configuration. Block and burst transfer size, block alignment, timing, and translation is adapted to the system configuration rather than being generic. This may allow the system to naturally accommodate burst transfer modes available from memories or peripherals rather than being limited by the processor's preconceived and hardwired block transfer modes.

In addition to bus protocols, the i/o system can be adapted to handle some of the low-level details of i/o stream processing, particularly those which are best done with efficient support for bit operations. Stripping off protocol headers, extracting fields, and responding rapidly to various signaling conditions are all tasks which are handled well with flexible hardware.

Reconfigurable i/o logic 100C can be arranged to strategically buffer data, according to application or peripheral requirements, coming and going from the processor 10. The logic 100c provides FIFO buffering as may be useful when embedding a compute processor in a system. The buffering can be system specific, tuned to the devices with which the processor is communicating. It can also be application specific, providing buffering which is appropriate only for certain kinds of data.

For instance, the processor 10 pumps out program locations for profiling operations. The reconfigurable logic 100c takes the location data, timestamps it, then buffers it for a free bus cycle on which to write the data into memory, and supply the appropriate addresses to store the profiling data in FIFO style into an allocated region of main memory. Note that this allows the system to take a time-stamped program trace while only requiring the processor 10 to execute a store instruction. Since the reconfigurable logic 100c is doing buffering and translation on-chip, the store need take no more processor cycles than a store to the on-chip cache.

The reconfigurable logic 100c can be used to provide direct interfacing to an attached long-or short-haul network. This would be particularly useful to adapt commodity processors for use in large-scale, multiprocessor computing systems. In the Cray T3D, for example, a separate ASIC is used to couple an Alpha microprocessor into the high-speed mesh network. With reconfigurable i/o, the network interface can be built on chip. This close coupling provides much higher network i/o performance, avoiding the overhead of going out to a remote device over a standard bus in order to communicate with the network. A network interface is, of course, one place where i/o data buffering may be necessary.

The reconfigurable i/o is also used to directly interface peripherals to the processor 10, without requiring off-chip glue logic. Chip selects and peripheral specific timing and control signals can be generated directly by the reconfigurable i/o 100c. Eliminating glue logic reduces part count and system cost.

With the reconfigurable i/o 100c, the processor 10 is configurable to handle external events smoothly and rapidly and provide special output signals. For example, in a polled device situation, busy or ready signals are run straight into the reconfigurable logic 100c. The impact of polling on processor cycle time need be no more than an on-chip cache access—less, if the signal can be computed into the processor's branch and conditioning logic. similarly, reconfigurable logic 100 can provide special output signals, such as the context ID in the April/Sparcle microprocessor disclosed by Anant Agarwal, Beng-Hong Lim, David Kranz, and John Kubiatowicz, "APRIL: A Processor Architecture for Multiprocessing," in Proceedings of the 17th International Symposium on Computer Architecture, pages 104–114, IEEE, May 1990.

The reconfigurable i/o is configurable to perform ECC or parity computations on data coming and going from memory in systems where error checking and correction is warranted.

The reconfigurable i/o can be used to do combining, checking, and voting when building highly reliable systems. In this setting, the standard microprocessor 10 with reconfigurable i/o 100c is adapted to work in such tandem configurations. For example, in a dual checking system, one can be configured to provide outputs, while the other can be configured to listen and compare its internal results to the results of the master. If they ever differ, the backup processor (not shown) signals the main to stop. Again, this reduces system cost by obviating the need for separate logic components to do the combining and checking. Additionally, it makes the single microprocessor design with reconfigurable i/o attractive for use when building reliable systems.

System specific synchronization is also handled by the reconfigurable i/o logic 100c. With hooks out to the actual i/o pins, the processor can generate and receive synchronization signals directly. The reconfigurable logic inside the processor can process the signaling accordingly. This could, for instance, be used to implement barrier synchronization in a multiprocessor. More interestingly, perhaps, it would allow one to implement application specific synchronization schemes. In some cases local synchronization between a few processors may be all that is required for correctness, and the reconfigurable processors can be adapted accordingly.

When the native byte order for the processor differs from that of the data being handled, the reconfigurable logic 100C provides the byte reordering as needed. Examples of cases where selective byte swapping may be necessary include attached peripherals or coprocessors with different byte orders, system or network software which expects a particular byte order, or file formats which require a specific byte order.

When formatting or processing messages, protocols, or packed data, the processor 10 may need to selectively extract and rearrange fields for processing or storage.

Often a data stream must be decoded before processing or encoded before exiting the processor 10. The reconfigurable logic 100c serves to translate data appropriately for internal use. Common examples include de/encryption of data for secure storage and transmission and (de)compression to minimize storage space or transmission time.

Often the processor's i/o system needs to remap addresses in some systematic way to address a data structure efficiently. For example, in the Cray T3D, an external address unit remaps addresses to block and distribute array elements. The reconfigurable i/o 100c is programmable to remap the addresses in an appropriate, data structure and system specific manner.

Generally, a few common advantages for the reconfigurable i/o 100c interface are summarized. Direct, on-chip interfacing saves the requisite chip-crossing latency associated with interfacing the processor 10 to a peripheral or system using a separate ASIC. System costs are reduced by reducing the number and kind of components required to interface the processor 10 to its peripherals and system environment. The reconfigurable i/o processor can adapt rapidly to changing and varied system architectures and standards and can serve to differentiate products.

4. Reconfigurable logic in memory devices

Figure 4:
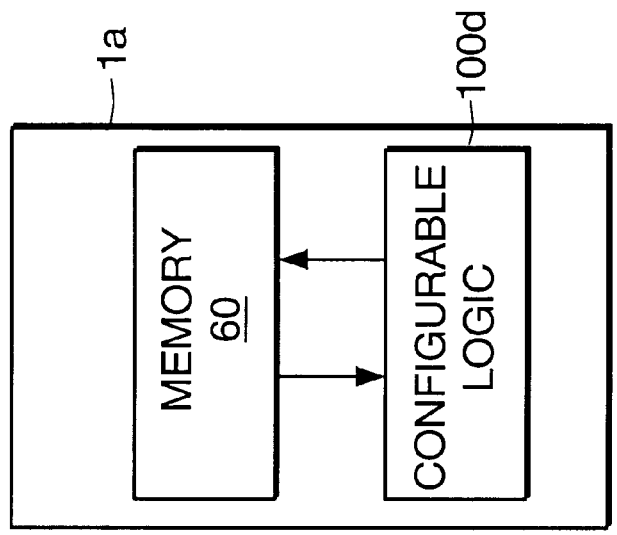
FIG. 4 is a block diagram of a third embodiment of the present invention in which a memory device is provided with configurable logic.

In still another embodiment shown in FIG. 4, the invention is implemented in a predominantly memory device that has some processing features. In many applications, video pixel processing, for example, the video data is organized in the memory substantially as it is physically arrayed in the displayed image. Many times in these application, for example, it is important to develop correlations between adjacent pixels. Historically, this required accessing each pixel and combining them in the accumulator of the microprocessor and then writing them back to the memory device.

In the present invention, this is accomplished by providing programmable logic array 100d in the processing memory device 1a on the same chip. This logic 100d can perform primitive logic functions such as adding, subtracting, or multiplying, for example, data in memory array 60. The configurable logic array 100d also included in the memory device 1a is then configured to perform the processing. For example, the configurable array 100d enables access to the locations in array 60 and performs the logic combination. Write back then occurs to the same location or a different memory location of the combined value. These operations can occur in serial as in conventional devices or parallel to offer high speed parallelism.

The provision of processing capability takes advantage of the high on-chip bandwidth associated with DRAM's. Conventional DRAM arrays are built out of numerous banks. The memory addresses are, consequently, broken into two parts: (1) a row address which selects the address to be read within each bank and (2) a column address which selects the bank whose data will actually be read. Internally, once the row address has been read, a large number of data bits are available. For a $n_b$ bank memory, with w-bit wide banks, $n_b$·w-bits are actually available at the inputs to the final selection process. In the most conventional architectures, all but w-bits are then thrown away during the final column selection process. The result is a meager i/o bandwidth to and from the memory, despite a huge on-chip bandwidth.

A 4 megabit DRAM, old by today's standards, is likely to have 512 or 1024 banks, with a 4- or 8-bit data width. The DRAM throws away almost three orders of magnitude in bandwidth during the final multiplexing stage. This gap only gets larger as we move to larger capacity DRAM arrays. The DRAM cell area shrinks, allowing greater density. However, the i/o's supported on die's perimeter does not grow commensurately with the internal memory capacity. In fact, the i/o capacity hardly grows at all.

Figure 5:
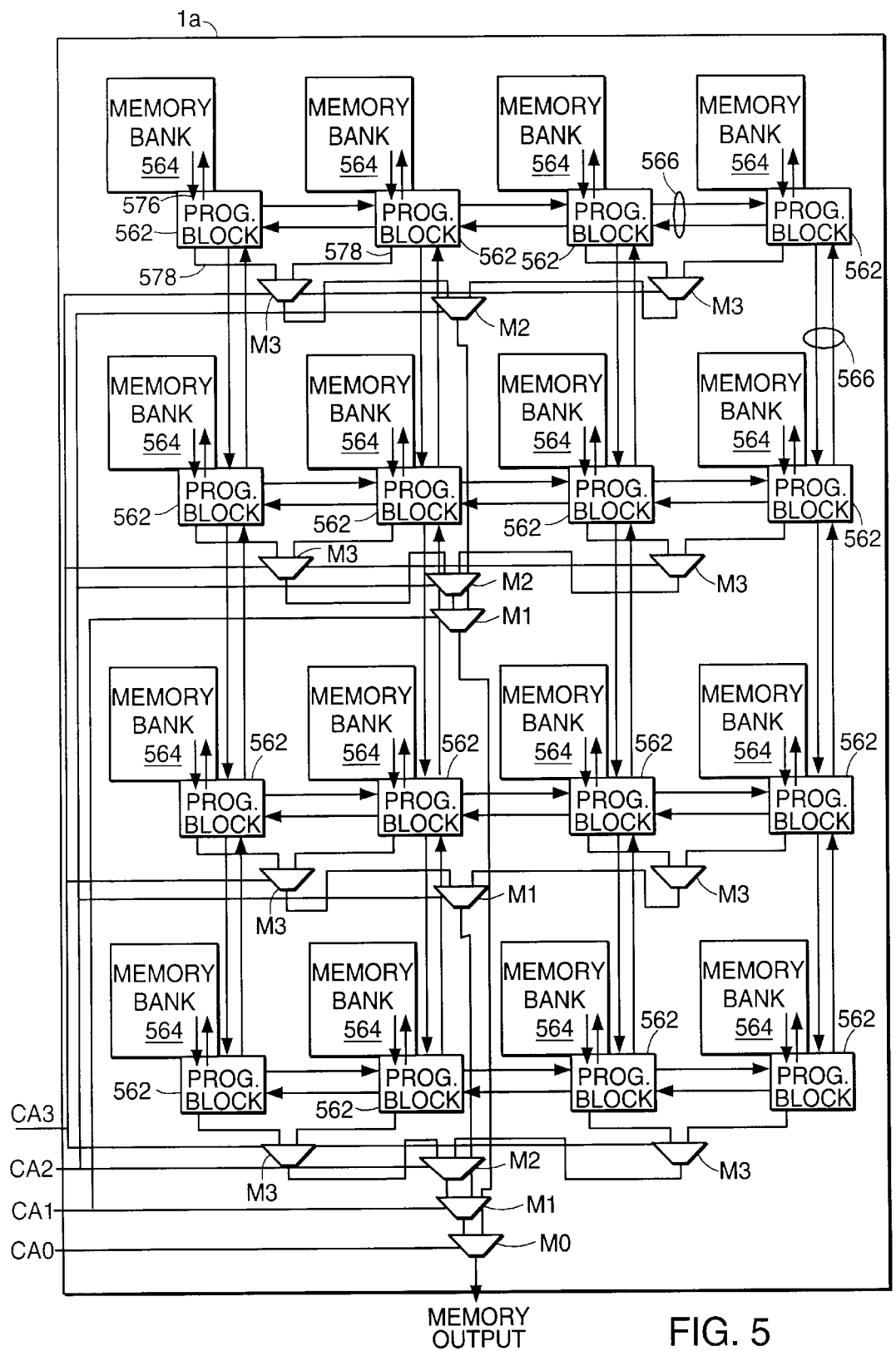
FIG. 5 shows a memory device 1a incorporating finer granularity in which a configurable PFU 562 is associated with each memory bank 564.

FIG. 5 shows an implementation of the memory device incorporating a finer level of granularity. Specifically, reconfigurable logic PFU's 562 are associated with each memory bank 564 of the device 1a. This reconfigurable PFU 562 directly consumes the bits which are read out of the associated DRAM bank 564. A programmable interconnect 566 transmits signals between PFU's 562 and off-device 1a. Since the banks 564 are physically arrayed on the DRAM array, the reconfigurable PFU's 562 are also gridded. The bank word output 576 runs directly into the programmable logic block 562 and the programmable logic, in turn provides a word output 578 into the final word selection tree. FIG. 5 shows a logarithmic depth tree of multiplexors M3–M0 used to select the final memory output from among the outputs 578 of each bank/PFU block 564/562.

Figure 5A:
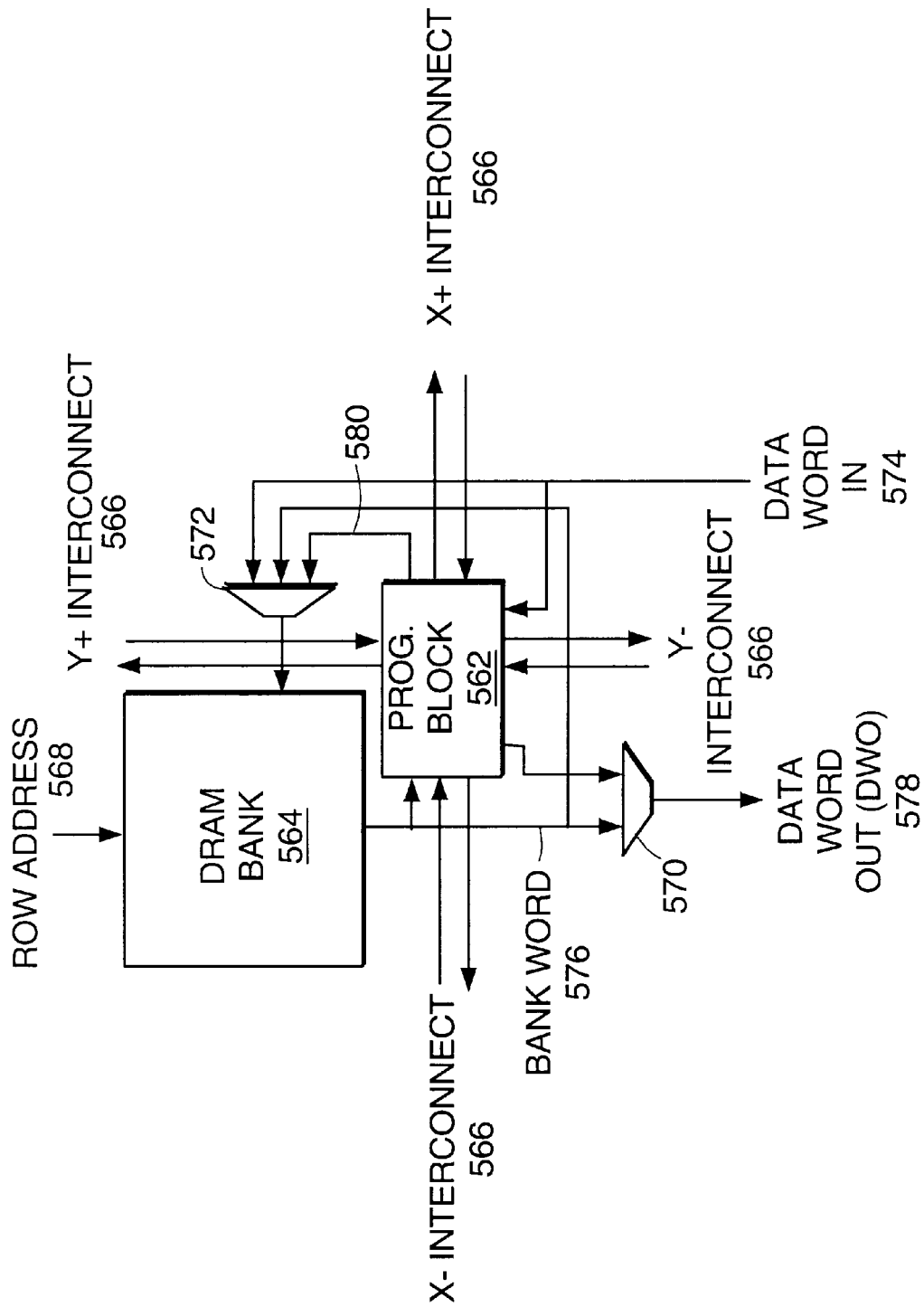
FIG. 5A shows a single memory bank and programmable PFU block 562.

FIG. 5A is a more detailed block diagram of a single DRAM memory bank 564 and programmable PFU block 562 extracted from the device 1A of FIG. 5. Specifically, the DRAM memory bank 564 is provided with a row address 568. The accessed data word from the DRAM bank 564 is provided both to an output bank multiplexor 570 and the programmable PFU block 562. In the programmable PFU block 562, logic calculations and combinations with other values from other blocks can be accomplished. These other values are transmitted to other blocks via the +/−y and +/−x lines of the interconnect 566. The output bank multiplexor 570 can then selects a value from the programmable PFU block 562 or the bank word from the DRAM bank 564. Data written back into the memory bank 564 may come from the programmable PFU block 562, from the data word in 574, or from the bank word 576 via bank input multiplexor 572. The interconnect 566 allows outputs from the logical elements in each programmable PFU block 562 to feed into other programmable blocks.

Figure 5B:
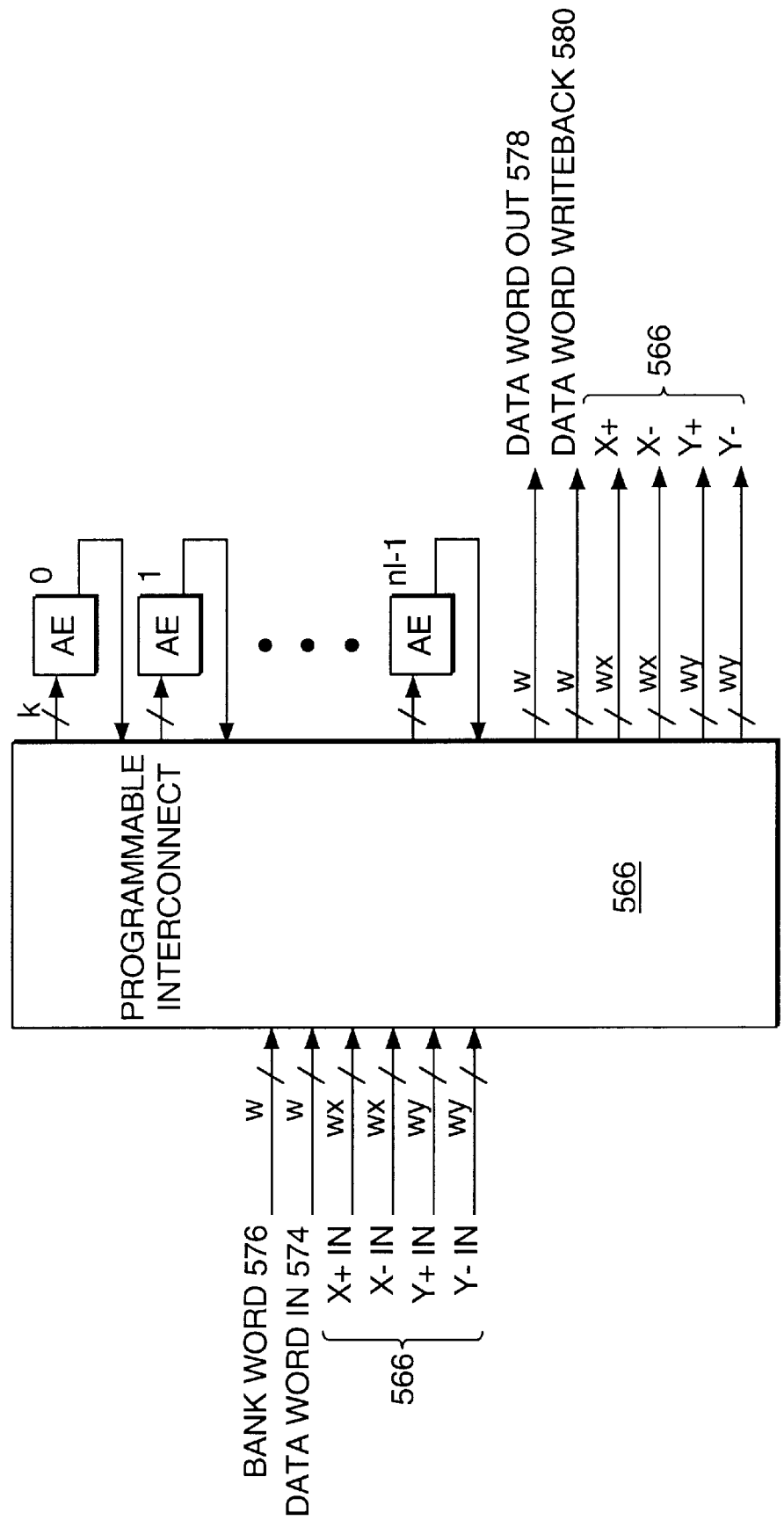
FIG. 5B shows the programmable interconnect 566 and array element connections AE of the programmable logic 562.

There is a large amount of flexibility in the implementation of the programmable PFU block 562. The number of array elements/block, the array element design, the amount of interconnect flexibility, and their topology can vary considerably. FIG. 5B shows a general formulation of such a logic block 562 with array elements $AE_O$–$AE_{n1-1}$, each with k-input bits, and a 1-bit output datapath. For local computation and writeback from the programmable logic, at least as many programmable array elements $AE_O$–$AE_{n1-1}$ are needed as data bits. Each array element AE can be implemented in any of a number of ways, input lookup table or piece of hardwired logic. Generally, the array elements AE will have optional or mandatory flip-flops latching of the output values computed, especially when the logic performed on the data is pipelined.

The interconnect 566 can be very general, e.g. a full crossbar in the worst case. In practice it is likely to be much more limited. First, a full-crossbar provides more flexibility than is useful if the array elements AE are actually lookup tables. Some connections of the interconnect 566 may be omitted simply because they are unnecessary. For example, Data Word Out 578 and Data Word Writeback 580 may be the same port since it is unlikely they will be used simultaneously. Also, there is no need to interconnect the Bank Word 576 to the Data Word Out 578 or Data Word Writeback 580 in the topology shown since there are direct connections which provide that effect outside of the programmable logic.

The interconnect 566 may be hierarchical and these lines may be broken down into lines which span varying distances in the array. In these cases, while or wy or wx lines may be consumed at each programmable logic block 562, the full wy or wx lines will not be generated at each block—or more properly, some of the lines will likely connect straight across each programmable logic block 562 without being switched within the block.

The output bank mux 570 is most likely controlled by read logic, retaining the ability to read and write straight from memory as a conventional DRAM without using the programmable logic 562. A control signal into the array of memory banks can control the desired behavior. The writeback data is selected in a similar manner.

The array elements and programmable logic may have multiple context configurations, i.e. DPGA. In these cases, the control lines into the array will select not only whether or not to use the programmable logic, as described above, but also which context should act at on a given cycle. One promising use of DPGA logic will be to perform multiple micro-cycle operations on each array memory operation. Conventional DRAMs have 50–60 ns cycle times, roughly half row read and half in column select and readout. DPGA logic, in today's technology, with one or two LUT and local interconnect delays can operate with a 5 ns cycle time. Consequently, one can reasonably expect to cycle through several array operation for each memory operation.

The programmable interconnect 566 will also need to configured. It will generally be most convenient and economical to integrate programmable logic programming with the memory array datapath. In the minimal case, additional address lines specify when writes are destined to programmable configuration, and configuration data is loaded from the Data Word In 574 associated with each bank 564. A more useful configuration will be to connect the configuration input to the Bank Word lines, allowing the array elements AE to exploit the full on-chip bandwidth of the DRAM array for configuration reloading. Of course, there still is the off-chip bottleneck to load the configurations into the DRAM to begin with, but once the data is loaded on the DRAM, parallel reloads allow the logic programming to change very rapidly.

5. Reconfigurable logic choices

The reconfigurable logic can be realized as one of many different structures.

Traditional, fine-grained logic FPGA modules with programmable interconnect (e.g. Xilinx LCA) is one likely candidate. The fine-grained structure is particularly good for random logic and bit manipulation.

Multiple context programmable logic, e.g. DPGA's, can provide density advantages over more traditional FPGAs, especially in situations where well defined subsets of the logic operate at different times. DPGA's also allow non-destructive background loading which can help reduce effective configuration overhead.

PAL-like array structures are good for smaller blocks of logic or for fast decoding.

In some setting a block of memory can serve as an efficient, programmable translation resource. Most programmable technologies are implemented out of smaller memories with programmable interconnect.

A more coarse-grained option is taught by Qiang Wang and P. Glenn Gulak, "An Array Architecture for Reconfigurable Datapaths," in Will Moore and Wayne Luk, editors, More FPGAs, pages 35–46, Abingdon EE&CS Books, 49 Five Mile Drive, Oxford OX2 8HR, UK, 1994 somewhere between a fixed processor and a bit-configurable FPGA.

In practice, a mix of fine-grained control and more specialized functional units embedded in a common reconfigurable mesh may be a very attractive choice for the reconfigurable logic in PFU and i/o logic.

7. Dynamically programmable gate array reconfigurable logic

The preferred architecture is the dynamically programmable gate array (DPGA). This architecture combines broad adaptability with intensive asset utilization and multi-context control.

Figure 6:
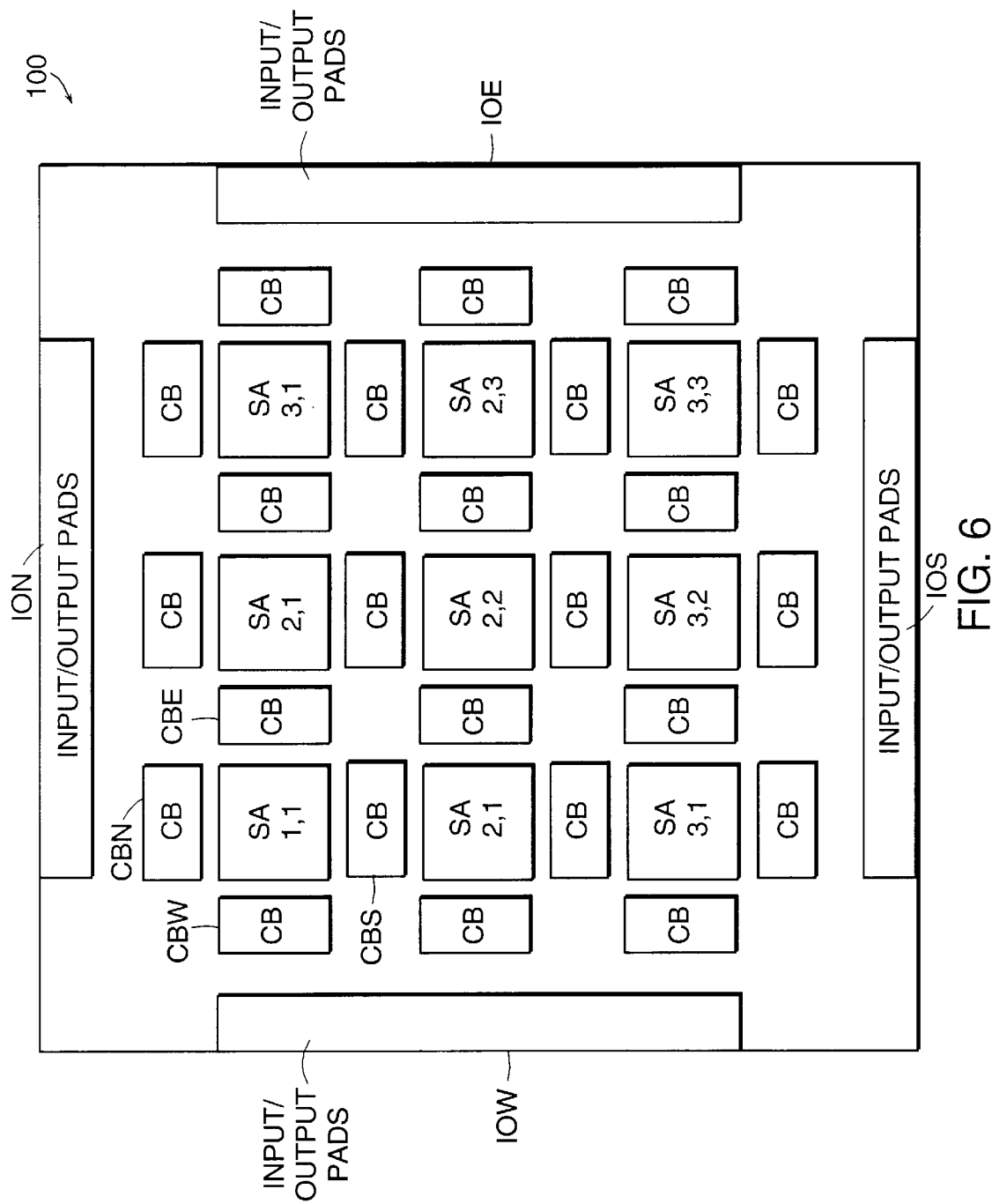
FIG. 6 is a block diagram of the dynamically programmable gate array (DPGA) 100 of the present invention showing the organization of the subarrays SA of array elements and the crossbars CB of the interconnect.

FIG. 6 illustrates a dynamically programmable gate array (DPGA) 100 constructed according to the principles of the present invention. Its architecture is organized into three logic block hierarchies. The core feature of the DPGA is a simple look up table backed by a multi-context memory block that stores the logic operations of the programmable gates (not shown in this view). Sixteen (4×4) AE's including the programmable gates are arranged into each subarrays SA1,1–SA2,2 with dense programmable local interconnects. At the chip level, nine (3×3) subarrays are connected by associated bidirectional crossbars CBN, CBE, CBW, CBS. Communication at the edge of the nine subarrays travels to the fixed logic processing units including the core cell or off-chip via input/output pads of the chip 1.

Figure 7A:
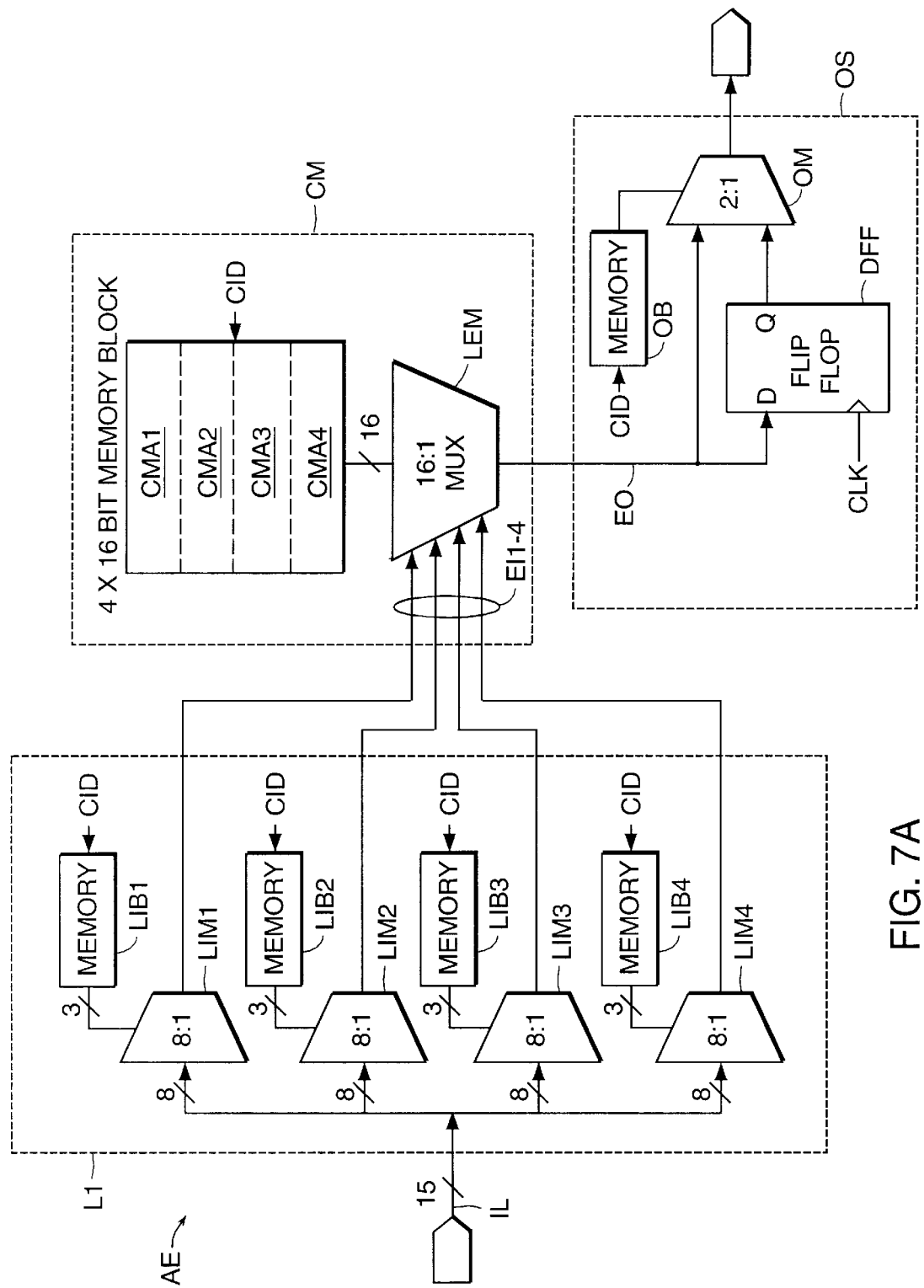
FIG. 7A is a simplified block diagram of an array element (AE) showing the level-one interconnect L1, the look up table CM, and the output selector OS.

FIG. 7A is a block diagram of array element (AE), which is the fundamental building block of the DPGA logic architecture. A symmetrical array architecture exploits AE comprises a level-one interconnect L1 that selects element input signals EI1–4 from fifteen possible interconnect lines IL.

Briefly, these fifteen lines comprise one self interconnect, i.e., a feedback from the output of the AE, six local interconnects that represent the outputs of the six other AE's that occupy either the same row or same column as the self AE in the subarray, and eight global interconnects that reach the AE through the adjoining crossbars servicing the AE's subarray.

More specifically, the level-one interconnect L1 comprises four, 8:1, multiplexors L1M1–4, each selecting among eight interconnect lines. Each multiplexor is provided with a different subset of the fifteen interconnect lines so that the selected element input signals EI1–4 can represent a broad spectrum of logic combinations of the fifteen signals available to the AE.

A 4 context×3 bit memory L1B1–4 is associated with each multiplexor and locally placed in the AE. These memories L1B1–4 provide a context dependent selection signal to the associated level-one multiplexor. To provide this function, the memories L1B1–4 each comprise four context memory vectors that are individually enabled by the CID. The three bits of the enabled context memory vector completely define the level one multiplexor operation. Thus, the level-one interconnect L1 locally stores routing configurations corresponding to each context, allowing routing changes on a context-to-context basis, and as fast as every clock cycle.

The second principle element of the replicated AE is the programmable gate, which is implemented here as look up table CM. The look up table CM is programmed with four truth tables of the four logic operations to be performed by the AE in the four contexts. The element input signals EI1–4 and a context identifier CID address the look up table CM to generate the appropriate output signal stored at the addressed location.

An N-input look up table can emulate any N-input logic gate, at the cost of storing $2^N$ entries in memory. Given the tradeoffs between speed, area, and granularity of the functionalities on an integrated level, a 4-input look up table is adopted to achieve an overall balance. Besides look up tables, other logic elements are possible. These include arithmetic logic units (ALU), larger or smaller look up tables, or multifunction gates having programmable interconnections. Generally, an ALU's range of possible operations is less and limited generally to arithmetic functions, such as addition, subtraction, and multiplication. This suggests the programmable gate is the preferable implementation and specifically look up tables.

The look up table CM comprises a 4 context×16 bit logic operation memory LOP comprising context memory vectors CMA1–4. These vectors are selectively enabled by the context identifier CID. The 16:1 multiplexor LEM accesses the enabled memory vector on the basis of the element input signals EI1–4 to retrieve the logic value corresponding to the desired logic operation. Thus, any 4 input×1 output logic operation is emulated.

An output selector OS receives the output signal EO from the look up table CM and latches it to alternatively provide either the current output of the look up table or the most recent output, the output on the last clock period. In more detail, the output selector OS latches the element output signal EO in an edge-triggered flip flop DFF in response to the clock signal CLK. The element output signal and the delayed element output signal are then presented to a 2:1 output multiplexor OM. An output select memory OB, 4 context×1 bits, drives this multiplexor OM to select either the element output signal or the delayed element output signal as a function of the context.

The output selector is particularly useful when computations require the execution of multiple contexts due to their complexity. During the initial context, combinational signals propagate through the array from the DPGA inputs. On the clock signal and the change to the next context, the resulting logic values are latched in the flip-flops DFF of the last AE's in the computation. These logic values then form the initial values for the computations of the next context. Specifically, when the context changes on the next clock cycle, the multiplexors are controlled to select the output Q of the flip-flop DFF, rather then the multiplexors LEM. Thus, the logic values are preserved into the next context by properly compiling the context information of the output memory OB.

Figure 7B:
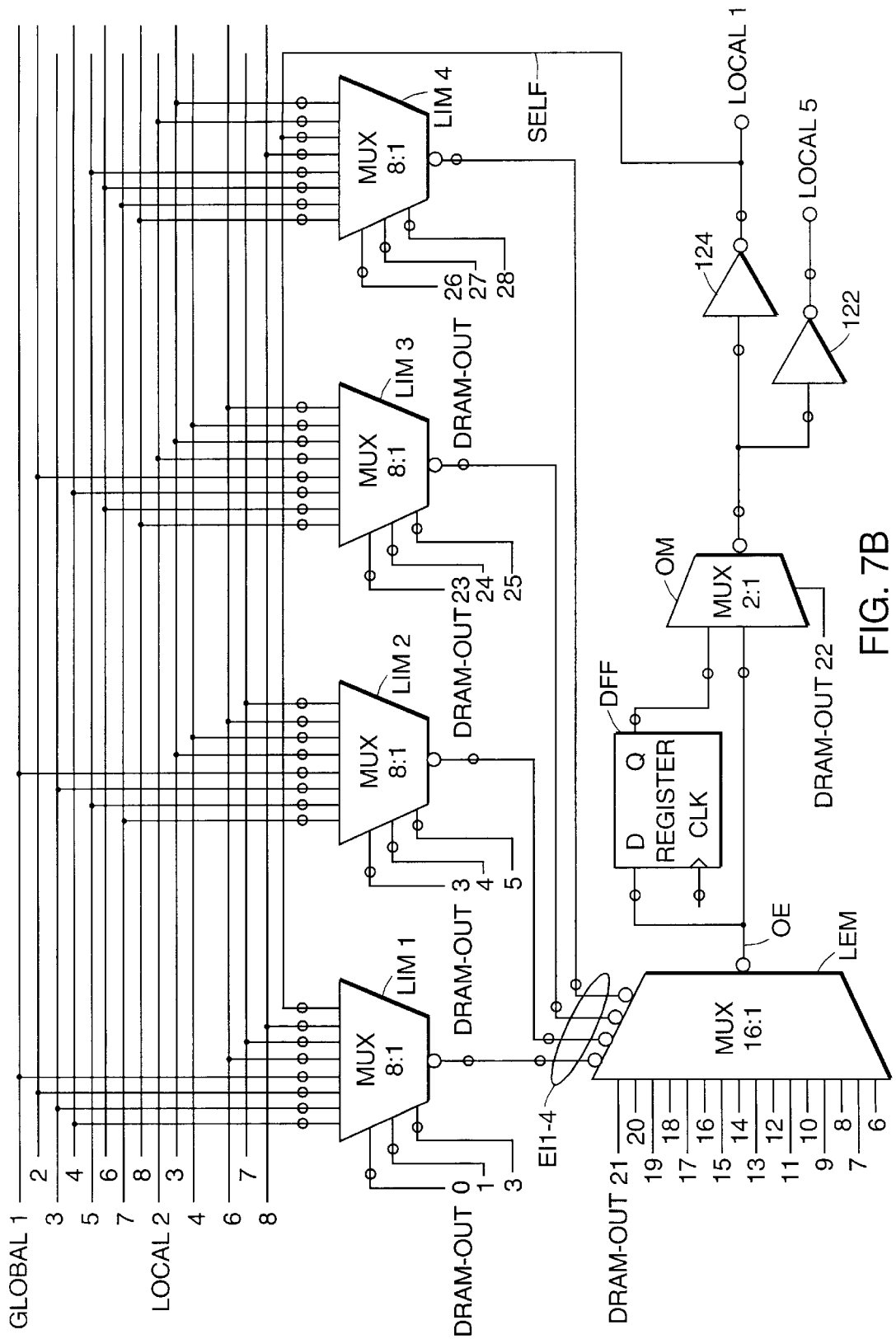
FIG. 7B is a schematic of the AE showing the details of the level-one interconnect without the memory block.

FIG. 7B is a less schematic illustration of the level-one interconnect and multiplexor arrangement of the AE. Specifically, global interconnect lines global 1–8, local lines 2–4, 6–8 and a self signal are provided in various combinations to each of the level-one multiplexors L1M1–4. DRAM output signals 1–5 and 23–28 are provided as selection signals to each of these multiplexors. The selected element input signals EI1–4 are received by the logic element multiplexor LEM as select signals. This 16:1 multiplexor LEM then provides one of the DRAM output signals 6–21. The selected element output signal is latched to the delay flip flop DFF and received at the 2:1 output multiplexor OM. A column driver 122 broadcasts the signal over the column local interconnect line, and a row driver 124 drives the row local interconnect line of the AE.

The AE makes use of three different types of multiplexor: one 16-to-1 for the look up table, four 8-1 for the input fan-in selector, and one 2-1 for an optional latched output. Two implementations of multiplexors are probable: one is a CMOS full-switch implementation using both NMOS and PMOS gates and the other is a pass-gate implementation using exclusively NMOS gates. The two implementations offer different tradeoffs in power consumption, area, and performance. The design decision, by convention, favors area and performance most.

The pass-gate implementation is more area efficient, requiring less than at most half of the area as the full-switch. However, a high pass-gate output signal does not reach a full $V_{dd}$, degraded by the n-channel threshold. This degraded voltage raises issues of static power dissipation when a buffer is used to restore the full $V_{dd}$. One way to improve the degraded output high is to add a feedback P-device from the output. This will assist the pull-up to a higher voltage and mitigate static power dissipation. The negative trade-off of the feedback is a slower output, resulting from a longer transition period between valid outputs due to voltage fight between transitive gates. Calculation shows that static power being dissipated is negligible. Therefore, it does not warrant the slower feedback implementation.

The full-switch implementation requires a paired PMOS gate for every NMOS gate to restore voltage by assisting pull-up. The cost of implementing PMOS gates is high in terms of layout, however. In addition to the double transistor count, full-switch requires P-devices and N-wells that add tremendous design rule constraints when doing layout. If equal rise and fall times are desired, the P-devices sizings have to more than double those of N-devices. This would effectively more than triple the gate area required by the pass-gate implementation. Even though full-switch provides a wider channel to reduce the resistance in the single path, the effect on speed by the added capacitance of P-device is greater than that of the reduction of resistance. The use of full-switch implementation will prove to be profitable only when the load capacitance is large.

Figure 7C:
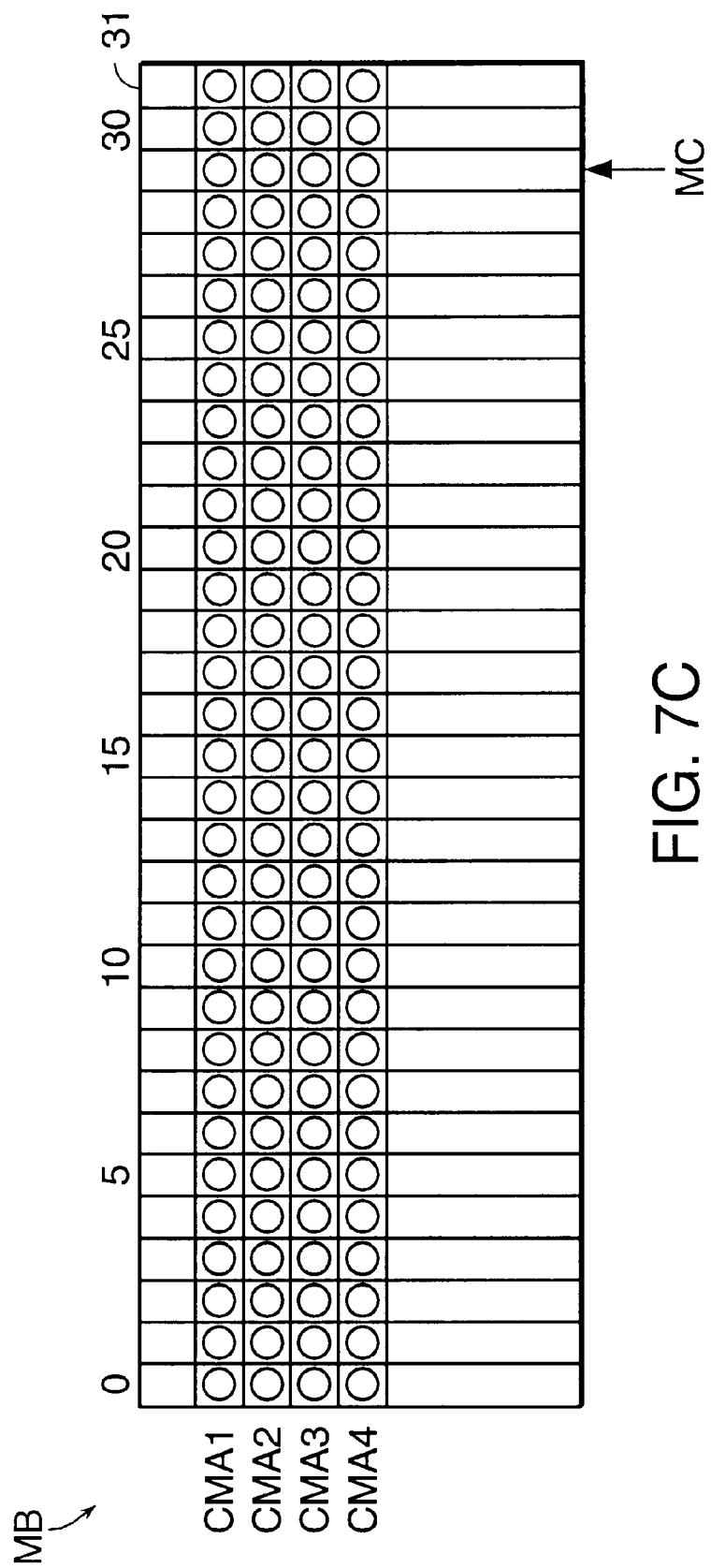
FIG. 7C schematically shows the 4-context by 32 column memory block MB of an AE.

FIG. 7C schematically shows a 32 column by 4 context memory block MB. As suggested by FIG. 7B, each of the level-one memory L1M1–4, the logic operation memory LOP, and the output memory block OB are actually implemented as a single 32-column memory block MB. This memory block comprises four rows corresponding to each of the context memory vectors CMA 1–4. Each of these rows is 32 bits wide.

Figure 7D:
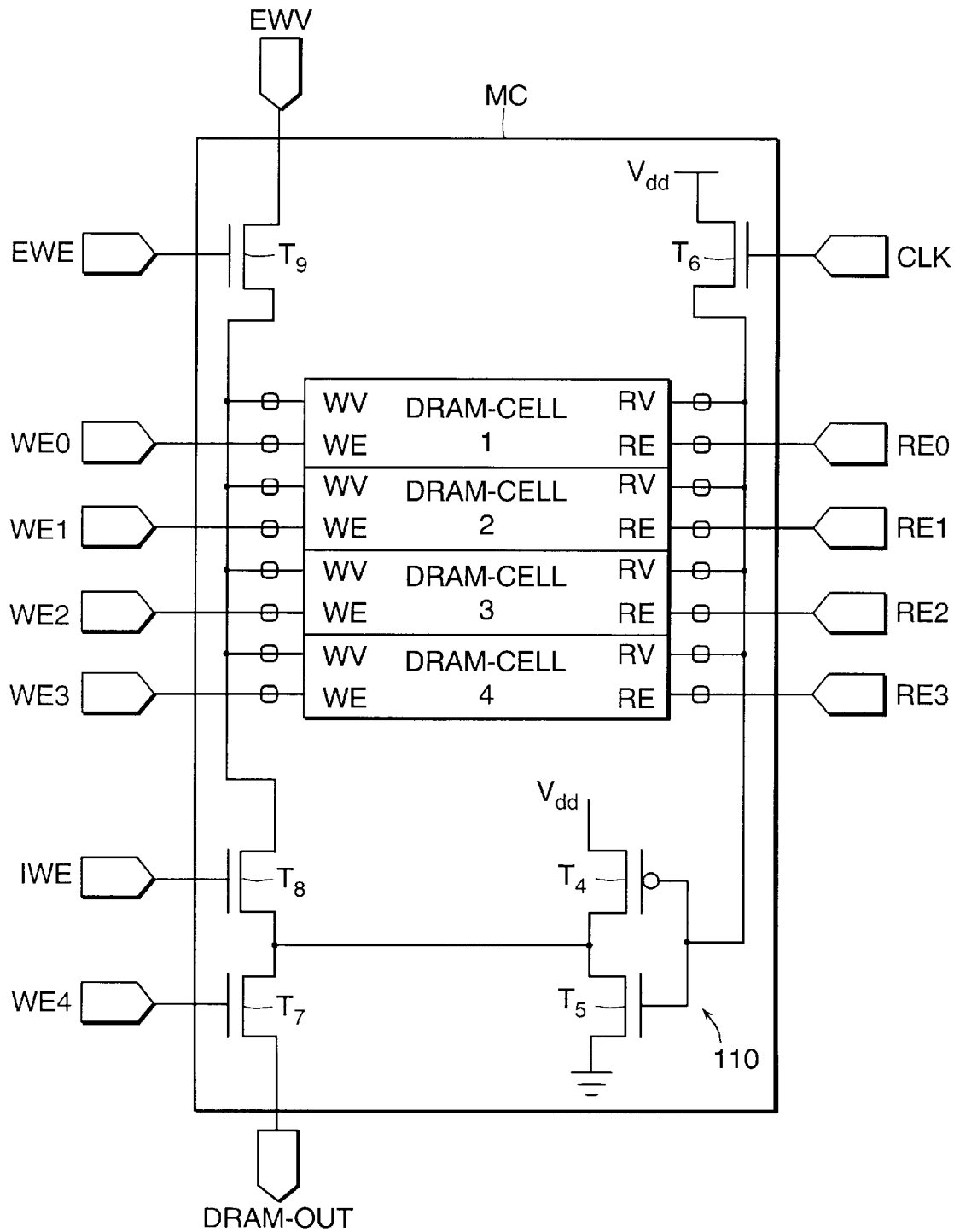
FIG. 7D shows an exemplary 4-bit memory column MC extracted from the memory block MB of FIG. 7C.

FIG. 7D shows an exemplary 4-bit column MC extracted from the 32 column memory block shown MB in FIG. 7C. Here, four DRAM cells 1–4 are separately addressable by read enable signals re0–3. The read value provided at DRAM cell ports RV is amplified by a pull-up/pull-down output driver and refresh inverter 110. Write enable lines we0–3 separately address the DRAM cells. The logic value stored in each DRAM cell is received at the write value ports WV under control of the write enable we0–3 and the enable write enable signal ewe.

The separate write enable, write value, read enable and read value lines effectively make the memory block a two-port memory allowing simultaneous reads and writes. Consequently, context data can be read from one of the DRAM cells, DRAM cell 1, for example, while a new context data is written to one of the other three DRAM cells 2–4. In the actual implementation, however, read/write operations of the memory is divided into two stages of system's single-phase clock. The read operation takes place in the first half of the clock cycle while the write operation takes place in the latter half. When the clock goes high, the read line charges to $V_{dd}$. The cell's memory read port is enabled during a read operation.

Figure 7E:
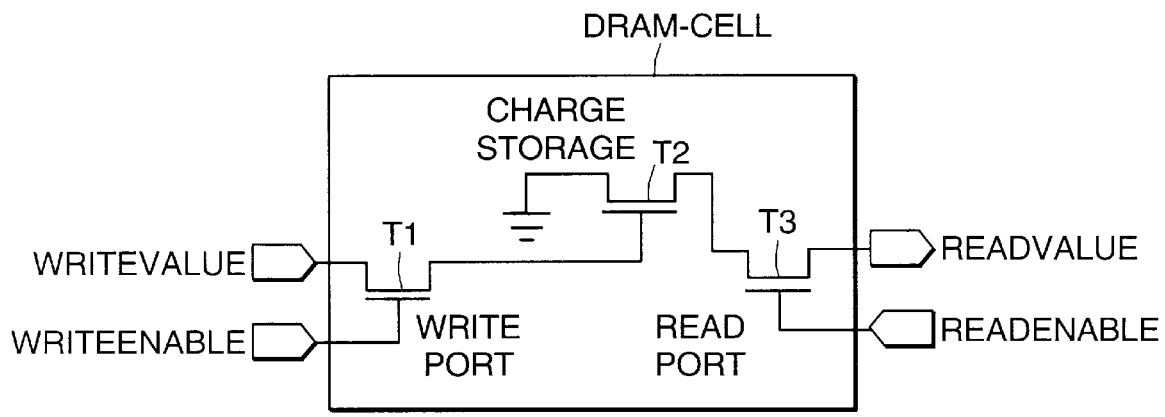
FIG. 7E shows a three transistor DRAM cell extracted from the 4-bit memory column of FIG. 7D.

FIG. 7E shows an exemplary DRAM cell from the memory column shown in FIG. 7D. This is 3-transistor implementation in which transistor T3 functions as a read port, T1 a write port, and T2 a storage device to store a binary bit by gate capacitance. While this DRAM cell can alternatively be a static RAM (SRAM) or even a fusible write-once implementation, the three transistor DRAM cell is space efficient while being dynamically re-programmable.

When a logical high is stored on the gate capacitance of the pull-down device T2. This pull-down device will turn on and fight with the pull-up device T4 of driver 110, attempting to charge the read value line.

On the latter half of the clock cycle, both the charge device T6 and the read port of the DRAM cell are disabled. The read line, with all gate and parasitic capacitances associated to it, retains the same value from previous half of the cycle. This value controls the output of the refresh inverter 110 which can selectively drive either the programming lines by enabling the IWE and EWE signals, or drive out by enabling the WE4 signal received by T7. Enabling the IWE and any of WE0–3 signals will cause the refresh inverter 110 to write a new value into that memory cell.

Pull-up devices are typically implemented using P-devices. However, in order to maximize the utilization of silicon area, N-device T6 is used instead for charging the memory column. The tradeoff of doing so is that the read line is only pulled up to a maximum of one threshold drop below the power rail, $V_{dd-VTH}$. In such case, the voltage is approximately 3.5V. The 3.5 V input, though a legal high as according to the inverter 110, does cause the P-device of the inverter to not properly turn off. The undesirable consequence is a fight of the two devices. Two factors in the design of the inverter assure that the NMOS transistor will prevail in this fight. First, the N-device turns on with 3.5V, versus the 1.5V of the P-device. Second, the NMOS transistor is sized identically to the PMOS. Because the N-device has greater mobility of electrons that the P-device, the former's relative strength is about 2.5 times stronger than that of the latter, and will prevail to pull the output line low.

Figure 7F:
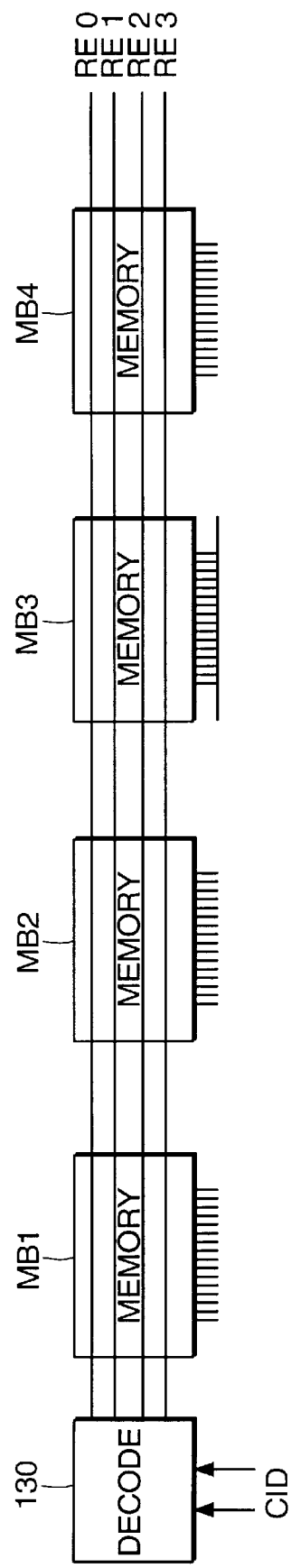
FIG. 7F is a block diagram illustrating four memory blocks MB of separate AE's sharing a single decoder 130.

Referring to FIG. 7F, the read enable signals re0–3 are generated from the CID by a decoder 130. In an actual implementation, the read enable lines are distributed to multiple 32 column memory blocks, MB1–4. Specifically, a single local context identifier decoder 130 is allocated for each group of four AE's. The memory blocks MB1–4 of those AE's are physically aligned so that common read enable lines re0–3 from the decoder can control the memory blocks MB1–4 in common. This decreases the real-estate required for the CID decoding.

Figure 8A:
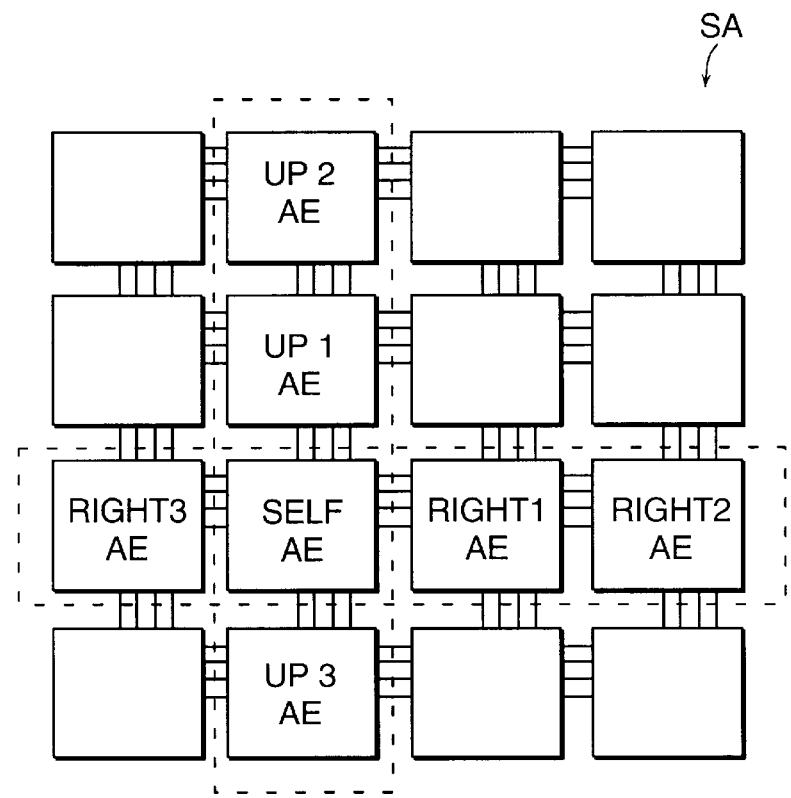
FIG. 8A is a block diagram showing the level-one interconnect for distributing local inputs between AE's of an exemplary subarray SA.
Figure 8B:
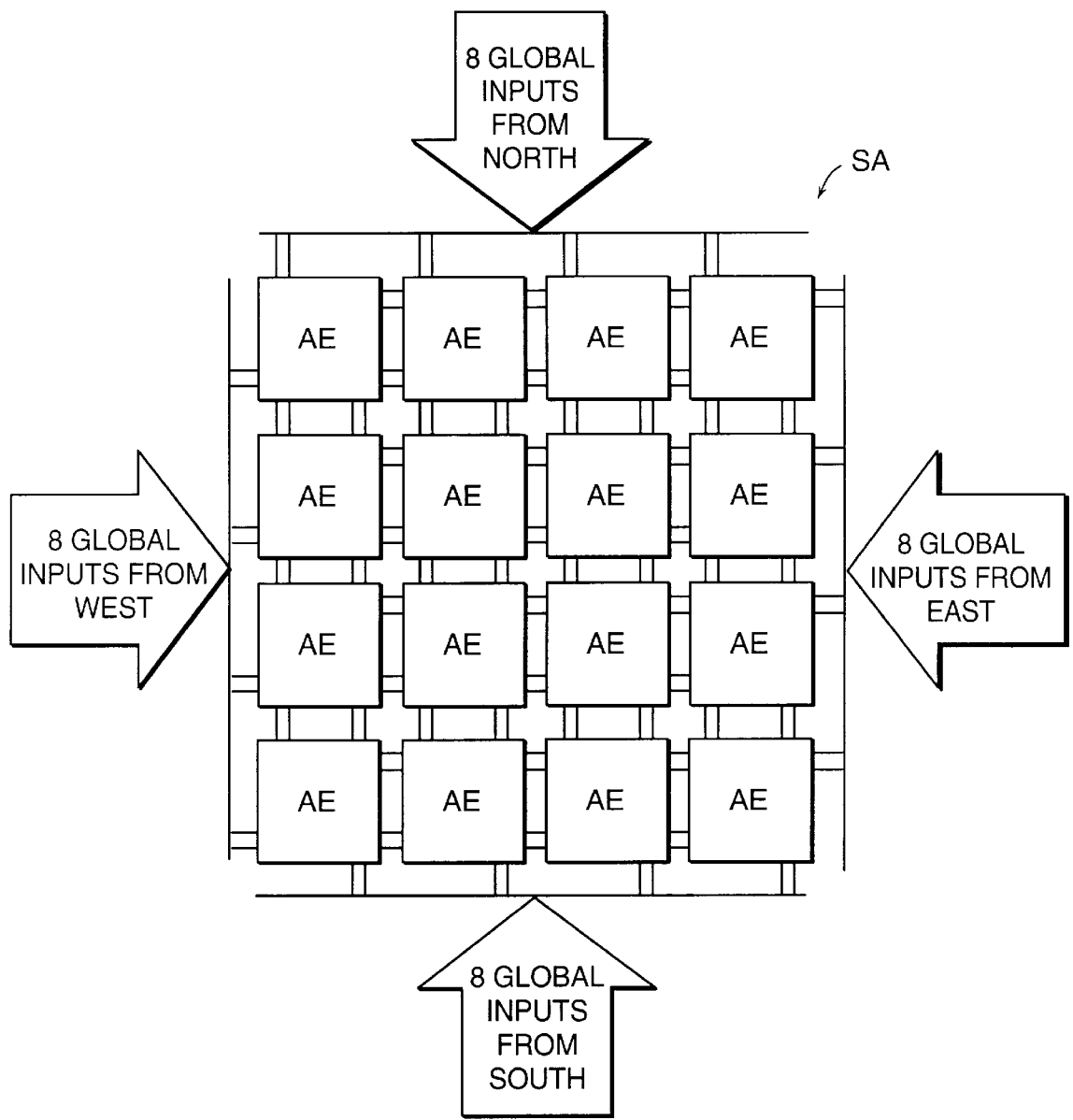
FIG. 8B is a block diagram showing the interconnect for distributing global inputs between the AE's of a subarray SA.

The level-one interconnect provides a balanced fan-in of local and global signals. As schematically illustrated in FIG. 8A, the local interconnect lines 2–8 of FIG. 7B originate from the three vector elements of the same row, right 1, 2, and 3, and three more from the same column: up 1, up 2, up 3. In combination with the one self feed back signal, a total of 7 intra-subarray signals are provided to each AE. As shown in FIG. 8B, incoming global signals global 1–8 of FIG. 7B come from outside the subarray SA from each of the four directions. In total, the level 1 interconnect provides 15 signals to each AE: 7 locals, 8 globals, and 1 self-feedback.

FIG. 6 shows the level-two interconnect. This shared routing network routes logic signals between AE's over lines that are assigned by context programming in response to the broadcast context CID, allowing the same physical line to transmit logic signals from different AE's. Each subarray SA1,1–3,3 shares four bidirectional crossbars CBN, CBE, CBW, CBS. Each of the bidirectional crossbars CB act as a source of the eight input global signals to each subarray and as a selector to transmit eight of the 16 total element output signals generated by that subarray. For example, crossbar CBE provides eight global signals to subarray SA1,1 that originate at subarray SA2,1. Crossbar CBE also receives the element output signals that are generated by the sixteen array elements AE of subarray SA1,1 and selects one of the sixteen signal to drive into each of the eight lines of the subarray SA2,1.

Figure 9A:
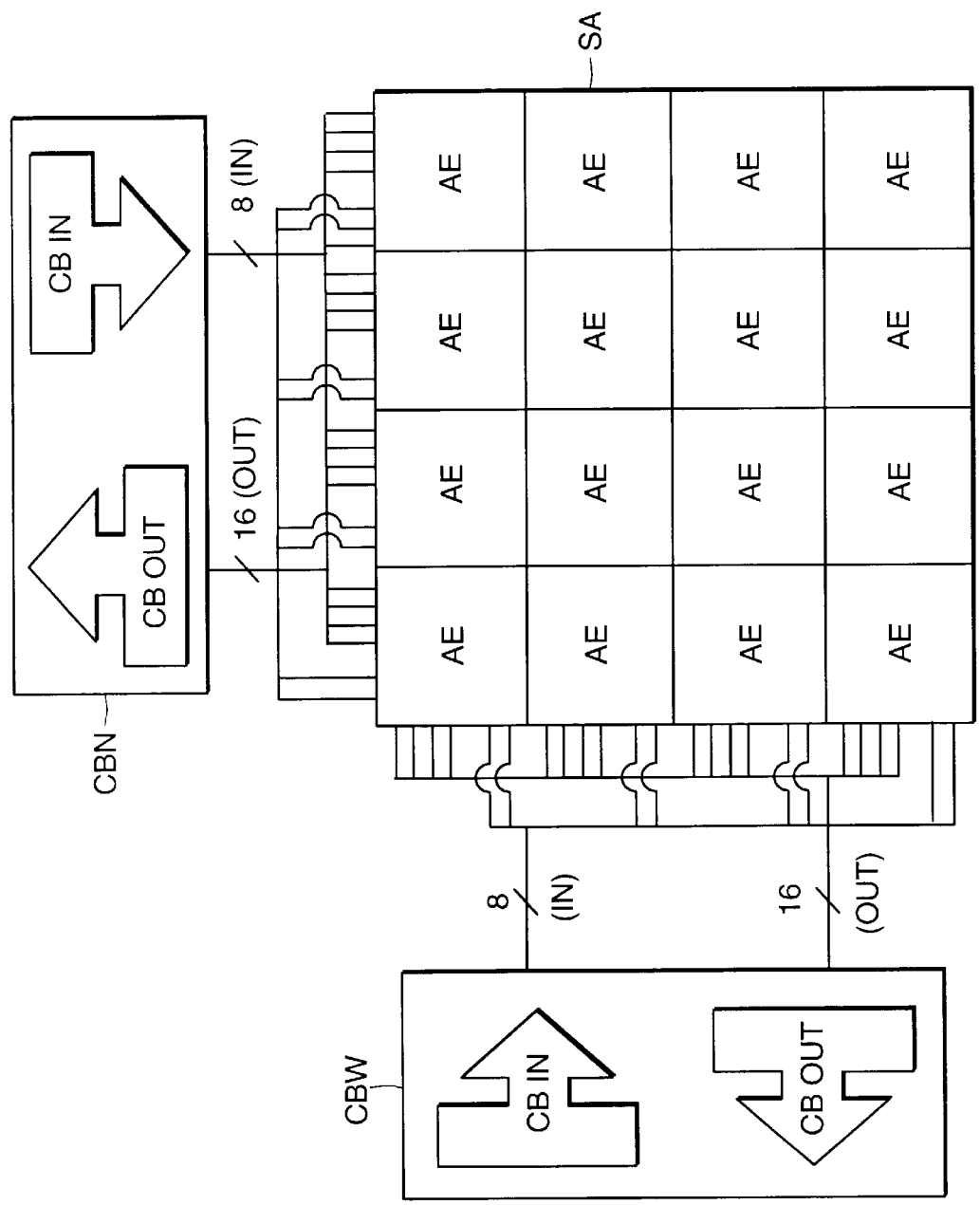
FIG. 9A is a block diagram showing two exemplary bidirectional crossbars CBW, CBN providing the global signals to AE's of a subarray and receiving the sixteen local signals from the AE's for distribution to other subarrays.

FIG. 9A shows two crossbar interconnections for an exemplary one of the subarrays SA extracted from the DPGA 100. Specifically, the bidirectional crossbar CBN, for example, contains two unidirectional input and output crossbars CBOUT, CBIN with respect to that subarray SA. The outgoing crossbar CBOUT picks up the sixteen column local interconnect lines from each of the array elements and selectively provides only eight to an adjoining subarray SA (not shown). In the similar vein, the incoming unidirectional crossbar CBIN selectively provides eight of the sixteen signals from that adjoining subarray as the eight global signals received by the illustrated subarray.

Figure 9B:
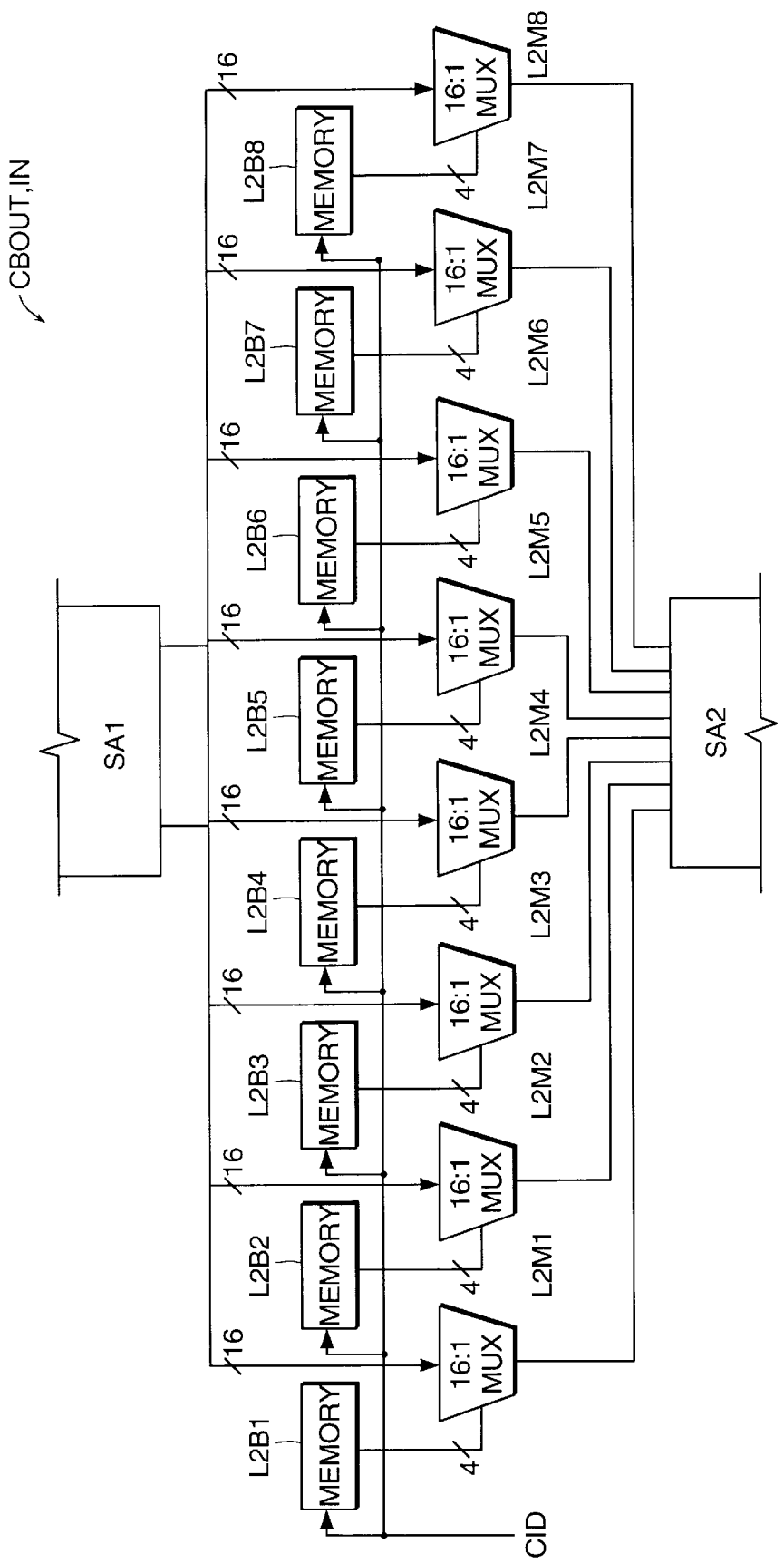
FIG. 9B is a block diagram of the internal architecture of one of the unidirectional crossbars CBIN.

FIG. 9B shows the internal architecture of the unidirectional crossbars CBIN,CBOUT. Here, eight level-two multiplexors L2M1–8 receive the same sixteen local signals from the sending subarray SA1. Each one of these level-two multiplexors selects and transmits one of the signals to the second subarray SA2. The selective transmission of each one of these level-two multiplexors L2M1–8 is controlled by eight level-two memories L2B1–8 that are positioned locally in the crossbar. The level-two memories L2B1–8 are 4 context by 4 bit memories which receive the context identifier CID to selectively enable one of the four context arrays. As a result, different global routing patterns can be provided on every change in the context.

These level-two memories L2B1–8 are constructed as shown in FIGS. 7C–7E. More specifically, as shown in FIG. 7C, the level-two memory L2M1–8 can be implemented in a single 4 context by 32 column memory block 14B. Here, however, four columns are assigned to each of the eight second-level multiplexors. Further, the memory block is dual port as described in reference to FIG. 7D whereby one context can be currently used to control the multiplexors while one of the other 3 dormant contexts can be reprogrammed with new context data. And, as discussed in reference to FIG. 7F, each group of four crossbar memory blocks can share a single decoder.

While this invention has been particularly shown and describe with references to preferred embodiments thereof, it will be understood by those skilled in the art that various changes in form and details may be made therein without departing from the spirit and scope of the invention as defined by the appended claims.

We claim:

1. A single chip microprocessor having reprogrammable characteristics, comprising:

processor for performing logic calculations in response to data input, and including a cache; and programmable gate array integrated with the processor and configurable by the processor, wherein the programmable gate array is interfaced directly with a register file of the processor and transforms logic signals being read from the cache, wherein the cache is an instruction-cache, and the programmable gate array functions as a programmable instruction decoder and cooperates with the instruction-cache to convert instructions to a new format that is compatible with the processor.

2. A microprocessor as described in claim 1, wherein the processor selects the context of the programmable gate array.

3. A processor as described in claim 1, wherein the programmable gate array is configurable to operate as a function unit of the microprocessor.

4. A microprocessor as described in claim 3, wherein the configurable gate array is configurable to operate as an application-specific accelerator.

5. A microprocessor as described in claim 1, wherein the programmable gate array is configurable to generate a ready-result signal for indicating that the programmable gate array has concluded calculations on data received from the processor.

6. A microprocessor as described in claim 1, wherein the programmable gate array is adapted to generate a ready-input signal indicating that the programmable gate array is ready to receive new data from the processor.

7. A microprocessor as described in claim 1, further comprising input/output pads for supporting off-chip communications, wherein the programmable gate array receives input signals from and provides output signals to the input/output pads.

8. A microprocessor as described in claim 7, further comprising load and store registers for holding signals on the input/output pads, wherein the programmable gate array receives the input signals through load and store registers.

9. A microprocessor as described in claim 1 wherein the instructions in the new format are provided to the processor.

10. A single chip microprocessor having reprogrammable characteristics, comprising:

processor for performing logic calculations in response to data input; and programmable gate array, integrated with the processor and configurable by the processor, which functions as a programmable instruction decoder, wherein the processor further comprises:
   an expander;
   a concentrator; and
   at least one memory unit receiving addresses and data from the expander and providing data to the concentrator.

11. A microprocessor as described in claim 10, wherein the memory unit is deployable as instruction and data caches.

12. A microprocessor as claimed in claim 10, wherein the expander and the concentrator are partially controlled by an instruction decoder and partially by programmable logic.

13. A microprocessor as described in claim 10, wherein the memory is deployable as an explicit scratch pad memory.

14. A single chip microprocessor having reprogrammable characteristics, comprising:
   processor for performing logic calculations in response to data input; and
   programmable gate array integrated with the processor and configurable by the processor,
wherein the processor comprises
   an expander;
   a concentrator; and
   functional units that perform logic operations on input data from the expander and pass results to the concentrator.

15. A microprocessor as described in claim 14, further comprising a route from the concentrator to the expander to allow cascaded operations.

16. A microprocessor as described in claim 14, further comprising memory units between the expander and concentrator.

17. A microprocessor as described in claim 16, wherein the memory units are groupable to accommodate wider data paths.

18. A microprocessor as described in claim 14, wherein the functional units include arithmetic logic units.

19. A single chip microprocessor having reprogrammable characteristics, comprising:
   processor for performing logic calculations in response to data input; and
   programmable gate array integrated with the processor and configurable by the processor,
wherein the processor comprises:
   functional units that perform logic operations on input data; and
   a reconfigurable interconnect that routes data output from the functional units and the programmable gate array back to the units along reconfigurable data paths.

20. A microprocessor as described in claim 19, further comprising memory units in parallel with the functional units.

21. A microprocessor as described in claim 20, wherein the memory units are groupable to accommodate wider data paths.

22. A single chip microprocessor having reprogrammable characteristics, comprising:
   processor for performing logic calculations in response to data input, and including a cache; and
   programmable gate array integrated with the processor and configurable by the processor, wherein the programmable gate array is interfaced directly with a register file of the processor and transforms logic signals being read from the cache,
wherein the cache is an instruction-cache, and the programmable gate array functions as a programmable instruction expander and cooperates with the instruction-cache to convert instructions to a new format that is compatible with the processor.

* * * * *